(12) United States Patent
Cao et al.

(10) Patent No.: US 12,154,380 B2
(45) Date of Patent: Nov. 26, 2024

(54) FACE IMAGE PROCESSING METHOD AND APPARATUS, FACE IMAGE DISPLAY METHOD AND APPARATUS, AND DEVICE

(71) Applicant: Tencent Technology (Shenzhen) Company Limited, Shenzhen (CN)

(72) Inventors: Yun Cao, Shenzhen (CN); Hui Ni, Shenzhen (CN); Feida Zhu, Shenzhen (CN); Xiaozhong Ji, Shenzhen (CN); Ying Tai, Shenzhen (CN); Yanhao Ge, Shenzhen (CN); Chengjie Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 196 days.

(21) Appl. No.: 17/969,435

(22) Filed: Oct. 19, 2022

(65) Prior Publication Data
US 2023/0042734 A1 Feb. 9, 2023

Related U.S. Application Data

(63) Continuation of application No. PCT/CN2021/122656, filed on Oct. 8, 2021.

(30) Foreign Application Priority Data

Nov. 2, 2020 (CN) .......................... 202011203504.5

(51) Int. Cl.
*G06V 40/16* (2022.01)
*G06T 15/04* (2011.01)
(Continued)

(52) U.S. Cl.
CPC ............ *G06V 40/178* (2022.01); *G06T 15/04* (2013.01); *G06T 19/20* (2013.01); *G06V 10/774* (2022.01);
(Continued)

(58) Field of Classification Search
None
See application file for complete search history.

(56) References Cited

U.S. PATENT DOCUMENTS 5,850,463 A * 12/1998 Horii ....................... G06T 17/00
345/646
10,695,018 B2 6/2020 Dong et al.
(Continued)

FOREIGN PATENT DOCUMENTS

CN 101556701 A 10/2009
CN 109308450 A 2/2019
(Continued)

OTHER PUBLICATIONS

Hongyu Yang, Di Huang, Yunhong Wang, and Anil K Jain, "Learning face age progression: A pyramid architecture of GANs," in IEEE Conference on Computer Vision and Pattern Recognition, 2018, pp. 31-39. (Year: 2018).*

(Continued)

*Primary Examiner* — Edward Martello
(74) *Attorney, Agent, or Firm* — Crowell & Moring LLP

(57) ABSTRACT

A face image processing method and apparatus, a face image display method and apparatus, and a device are provided, belonging to the technical field of image processing. The method includes: acquiring a first face image of a person; invoking an age change model to predict a texture difference map of the first face image at a specified age, the texture difference map being used for reflecting a texture difference between a face texture in the first face image and a face texture of a second face image of the person at the specified age; and performing image processing on the first face image based on the texture difference map to obtain the second face image.

19 Claims, 19 Drawing Sheets

(51) Int. Cl.
*G06T 19/20* (2011.01)
*G06V 10/774* (2022.01)
*G06V 20/70* (2022.01)

(52) U.S. Cl.
CPC ............ *G06V 20/70* (2022.01); *G06V 40/161* (2022.01); *G06T 2219/2004* (2013.01); *G06T 2219/2021* (2013.01)

(56) References Cited

U.S. PATENT DOCUMENTS

| | | | | |
|---|---|---|---|---|
| 2014/0185926 | A1* | 7/2014 | Ricanek, Jr. ......... | G06V 40/172 |
| | | | | 382/159 |
| 2018/0276883 | A1* | 9/2018 | D'Alessandro ......... | G06T 11/60 |
| 2018/0365874 | A1* | 12/2018 | Hadap .................... | G06N 3/045 |
| 2021/0407153 | A1* | 12/2021 | Despois ............... | G06V 10/765 |
| 2022/0084173 | A1* | 3/2022 | Liang ........................ | G06T 5/50 |

FOREIGN PATENT DOCUMENTS

| | | |
|---|---|---|
| CN | 110348352 A | 10/2019 |
| CN | 111612872 A | 9/2020 |
| CN | 112287852 A | 1/2021 |
| JP | 2005-063078 A | 3/2005 |
| JP | 2020-515592 A | 5/2020 |
| WO | WO 2017/006615 A1 | 1/2017 |

OTHER PUBLICATIONS

Zhifei Zhang, Yang Song, and Hairong Qi, "Age progression/regression by conditional adversarial autoencoder," in IEEE Conference on Computer Vision and Pattern Recognition, 2017, pp. 5810-5818. (Year: 2017).*
Wang et al. "Recurrent face aging." Proceedings of the IEEE conference on computer vision and pattern recognition. 2016, pp. 2378-2386 (Year: 2016).*
Office Action issued on Chinese application No. 202011203504.5 on Jul. 22, 2023 and English translation appended, 11 pages.
International Search Report and Written Opinion with English Translation for International Patent Application No. PCT/CN2021/122656 dated Jan. 12, 2022, 13 pages.
Office Action issued on Japanese application No. JP-2023-513667 on Feb. 1, 2024 and English translation appended, 12 pages.
Zhu, Haiping et al., "Look Globally, Age Locally: Face Aging With An Attention Mechanism", ICASSP 2020—2020 IEEE International Conference on Acoustics, Speech and Signal Processing, USA IEEE, Apr. 9, 2020, 5 pages.

* cited by examiner

FACE IMAGE PROCESSING METHOD AND APPARATUS, FACE IMAGE DISPLAY METHOD AND APPARATUS, AND DEVICE

RELATED APPLICATION

This application is a continuation application of PCT Patent Application No. PCT/CN2021/122656, filed on Oct. 8, 2021, which claims priority to Chinese Patent Application No. 202011203504.5 filed with the China National Intellectual Property Administration on Nov. 2, 2020, each of which is incorporated by reference in its entirety.

FIELD OF THE TECHNOLOGY

This application relates to the technical field of image processing, and particularly, to a face image processing method and apparatus, a face image display method and apparatus, and a device.

BACKGROUND OF THE DISCLOSURE

As a machine learning technology continues to be matured, there are more and more types of services based on the machine learning technology. For example, a computer device can process a first face image to obtain a second face image through the machine learning technology. A first age corresponding to a face in the first face image and a second age corresponding to a face in the second face image are different, but correspond to the same identity.

The computer device usually processes the first face image through a machine learning model according to the inputted first face image and a face age change operation of a user, thereby obtaining the second face image. The face age change operation is used for instructing the computer device to make the face in the second face image younger or older.

When the face image is processed by the above-mentioned method, the face image can only be simply made younger or older. Therefore, the flexibility and accuracy of processing of a face image in an age dimension are low.

SUMMARY

This disclosure provides a face image processing method and apparatus, a face image display method and apparatus, and a device. The flexibility and accuracy of processing of a face image in an age dimension can be improved. The technical solutions are as follows:

According to one aspect of this application, a face image processing method is provided, the method including:
  acquiring a first face image, the first image may include a face image of a person;
  invoking an age change model to predict a texture difference map of the first face image at a specified age, the texture difference map being used for reflecting a texture difference between a face texture in the first face image and a face texture of a second face image of the person at the specified age, the second face image being a face image of a face of the person at the specified age;
  performing image processing on the first face image based on the texture difference map to obtain the second face image; and
  outputting the second face image.

According to another aspect of this application, a face image display method is provided, the method including displaying a first face image and an age change control, the age change control being a control used for inputting a specified age;
  invoking, in response to a trigger operation for the age change control, an age change model to process the first face image according to the specified age corresponding to the trigger operation to obtain a second face image, the second face image being a face image of a face in the first face image at the specified age; and
  displaying the second face image.

According to a further aspect of this application, an age change model training method is provided, the method including:
  acquiring a sample image set, the sample image set including a sample image and a sample age label of the sample image;
  determining a specified age, the specified age being a random age or the sample age label;
  invoking a generator in a generative adversarial network to predict, based on the specified age, the sample image to obtain a predicted face image;
  invoking a discriminator in the generative adversarial network to calculate an adversarial loss of the predicted face image, the adversarial loss being used for representing whether the predicted face image is a loss of a real face image;
  invoking an age prediction model to predict a predicted age of the predicted face image, and calculating an age loss between the predicted age and the specified age;
  training the generator according to the adversarial loss and the age loss; and
  determining the generator to be an age change model in a case that a training end condition is satisfied.

According to yet another aspect of this application, a face image processing apparatus is provided, the apparatus including:
  an acquisition module, configured to acquire a first face image;
  a prediction module, configured to invoke an age change model to predict a texture difference map of the first face image at a specified age, the texture difference map being used for reflecting a texture difference between a face texture in the first face image and a face texture of the specified age; and
  a first processing module, configured to perform, based on the texture difference map, image processing on the first face image to obtain a second face image, the second face image being a face image of a face in the first face image at the specified age.

Alternatively, the age change model includes a conditional generative network layer and a texture synthesis network layer; the prediction module is configured to:
  invoke the conditional generative network layer to predict, based on the specified age, the first face image, and output the texture difference map, the texture difference map being used for reflecting the texture difference between the face texture in the first face image and the face texture of the specified age;
  the first processing module is configured to invoke the texture synthesis network layer to superimpose the texture difference map with the first face image to obtain the second face image.

Alternatively, the conditional generative network layer is further used for outputting an attention map; the attention map is used for reflecting a weight coefficient of the texture difference corresponding to a pixel point (also referred to as pixel) in the first face image; the first processing module is configured to:

invoke the texture synthesis network layer to superimpose, based on the attention map, the texture difference map with the first face image to obtain the second face image.

Alternatively, the age change model further includes a shape change network layer; the apparatus further includes:

a second processing module, configured to invoke the shape change network layer to perform shape change processing on a face in the second face image.

Alternatively, the conditional generative network layer is further used for outputting a shape change information map; the shape change information map is used for predicting a face shape change of the face in the first face image relative to the specified age; the second processing module is configured to:

invoke the shape change network layer to perform, based on the shape change information map, shape change processing on the face in the second face image.

Alternatively, the shape change information map includes displacement information corresponding to the pixel point in a first direction and a second direction, the first direction and the second direction being perpendicular to each other; the second processing module is configured to:

invoke the shape change network layer to perform, based on the displacement information in the first direction and the second direction, bilinear displacement on the pixel point in the second face image.

Alternatively, the apparatus further includes:

a third processing module, configured to perform semantic image segmentation on the second face image to obtain a hair region in the second face image;

a calculation module, configured to calculate a corresponding target color value of the pixel point in the hair region at the specified age in a mapping manner based on an original color value of a pixel point in the hair region; and a replacement module, configured to replace the original color value of the pixel point in the hair region by the target color value.

Alternatively, the apparatus further includes:

a fourth processing module, configured to input the first face image into a face detection model, and output a face alignment point in the first face image; and a fifth processing module, configured to perform image matting on the first face image according to the face alignment point and affine transformation to obtain an aligned first face image.

Alternatively, the apparatus further includes a training module; the age change model is obtained by training by the training module; the training module is configured to:

acquire a sample image set, the sample image set including a sample image and a sample age label of the sample image;

determine a specified age, the specified age being a random age or the sample age label;

invoke a generator in a generative adversarial network to predict, based on the specified age, the sample image to obtain a predicted face image;

invoke a discriminator in the generative adversarial network to calculate an adversarial loss of the predicted face image, the adversarial loss being used for representing whether the predicted face image is a loss of a real face image. In one implementation, the adversarial loss may be 0 if the prediction result is correct and 1 if the prediction result is wrong;

invoke an age prediction model to predict a predicted age of the predicted face image, and calculate an age loss between the predicted age and the specified age;

train the generator according to the adversarial loss and the age loss; and determine the generator to be the age change model in a case that a training end condition is satisfied.

Alternatively, the training module is configured to:

invoke the age prediction model to perform age prediction on the sample image to obtain the sample image and the sample age label; and determine the sample image and the sample age label of the sample image to be the sample image set.

Alternatively, the training module is configured to:

input the sample image into a face detection model, and output a face alignment point in the sample image; and perform image matting on the sample image according to the face alignment point and affine transformation to obtain an aligned sample image.

Alternatively, the generator includes a conditional generative network layer and a texture synthesis network layer; the training module is configured to:

invoke the conditional generative network layer to predict, based on the specified age, the sample image, and output the texture difference map; the texture difference map being used for reflecting a face texture difference of a face in the sample image relative to the specified age; and invoke the texture synthesis network layer to superimpose the texture difference map with the sample image to obtain the predicted face image.

Alternatively, the conditional generative network layer is further used for outputting an attention map; the attention map is used for reflecting a weight coefficient of the texture difference corresponding to a pixel point in the sample image; the training module is configured to:

invoke the texture synthesis network layer to superimpose, based on the attention map, the texture difference map with the sample image to obtain the predicted face image.

Alternatively, the generator further includes a shape change network layer; the training module is configured to:

invoke the shape change network layer to perform shape change processing on a face in the predicted face image.

Alternatively, the conditional generative network layer is further used for outputting a shape change information map; the shape change information map is used for predicting a face shape change of the face in the sample image relative to the specified age; the training module is configured to:

invoke the shape change network layer to perform, based on the shape change information map, shape change processing on the face in the predicted face image.

Alternatively, the shape change information map includes displacement information corresponding to the pixel point in a first direction and a second direction, the first direction and the second direction being perpendicular to each other; the training module is configured to:

invoke the shape change network layer to perform, based on the displacement information in the first direction and the second direction, bilinear displacement on the pixel point in the predicted face image.

According to yet another aspect of this application, a face image display apparatus is provided, the apparatus including:

a display module, configured to display a first face image and an age change control, the age change control being a control used for inputting a specified age; and the processing module, configured to invoke, in response to a trigger operation for the age change control, an age change model to process the first face image according to the specified age corresponding to the trigger operation to obtain a second face image, the second face image being a face image of a face of the person in the first face image at the specified age;

the display module being configured to display the second face image.

Alternatively, the display module is configured to display the second face image and the specified age.

According to yet another aspect, an age change model training apparatus is provided, the apparatus including:

an acquisition module, configured to acquire a sample image set, the sample image set including a sample image and a sample age label of the sample image;

a first determination module, configured to determine a specified age, the specified age being a random age or the sample age label;

a prediction module, configured to invoke a generator in a generative adversarial network to predict, based on the specified age, the sample image to obtain a predicted face image;

a first calculation module, configured to invoke a discriminator in the generative adversarial network to calculate an adversarial loss of the predicted face image, the adversarial loss being used for representing whether the predicted face image is a loss of a real face image;

a second calculation module, configured to invoke an age prediction model to predict a predicted age of the predicted face image, and calculate an age loss between the predicted age and the specified age;

a training module, configured to train the generator according to the adversarial loss and the age loss; and a second determination module, configured to determine, in a case that a training end condition is satisfied, the generator to be an age change model.

According to another aspect of this application, a computer device is provided, including a processor and a memory, the memory storing at least one instruction, at least one program, a code set, or an instruction set, the at least one instruction, the at least one program, the code set, or the instruction set being loaded and executed by the processor to implement the face image processing method, the face image displaying method, or the age change model training method according to the foregoing aspect.

According to another aspect of this application, a non-transitory computer storage medium is provided, storing at least one piece of program code, the program code being loaded and executed by a processor to implement the face image processing method, the face image displaying method, or the age change model training method according to the foregoing aspect.

According to another aspect of this application, a computer program product or a computer program is provided, the computer program product or the computer program including computer instructions, the computer instructions being stored in a non-transitory computer-readable storage medium. A processor of a computer device reads the computer instructions from the non-transitory computer-readable storage medium, and executes the computer instructions, so that the computer device implements the face image processing method, the face image displaying method, or the age change model training method according to the foregoing aspect.

Beneficial effects of the technical solutions that are provided in this disclosure are at least as follows:

A first face image is processed through an age change model, so that a second face image can be generated and outputted according to a specified age. The second face image is a face image of a face in the first face image at the specified age. That is, a face image can be changed according to a specified age customized by a user or a specified age preset in a system, so that the flexibility and accuracy of processing of the face image in an age dimension are improved, and a clear and natural smooth transition change animation in all ages can be achieved.

DESCRIPTION OF EMBODIMENTS

First, terms involved in the embodiments of this disclosure are introduced as follows:

Generative Adversarial Network (GAN): It usually includes a Generator (G) and a Discriminator (D). Unsupervised learning is achieved by mutual competition between the generator and the discriminator. The generator performs random sampling from a latent space to obtain an input, and an output result needs to simulate a real sample in a training set as far as possible. An input by the discriminator is the real sample or the output of the generator, and its purpose is to take the output of the generator as an inputted input sample to distinguish it as much as possible from all input samples including the real sample. The generator, on the other hand, tries to fool the discriminator as much as possible. Therefore, an adversarial relationship between the generator and the discriminator is formed, so as to continuously adjust parameters and finally generate a fake picture to complete training of a model.

Semantic image segmentation: It is a very important field in computer vision, which refers to identifying an input image at a pixel level and marking each pixel point in the image with an object category to which it belongs. For example, various elements (including the hairs, the face, the facial features, the glasses, the neck, the clothes, the background, etc.) in a picture including a face are distinguished through a neural network.

Color look up table (LUT): Another corresponding color can be found according to an actually acquired color through a color LUT.

Artificial intelligent cloud service: The so-called artificial intelligent cloud service is generally also referred to as AI as a Service (AIaaS). This is a mainstream service of an artificial intelligence platform. Specifically, an AIaaS platform will split several types of common AI services and provide independent or packaged services in a cloud. This service mode is similar to opening an AI-themed mall: all developers can access and use one or more AI services (such as face image processing based on a specified age) provided by the platform through an Application Programming Interface (API); and some senior developers can also use an AI framework and AI infrastructure provided by the platform to deploy, operate and maintain own dedicated cloud AI services.

Figure 1:
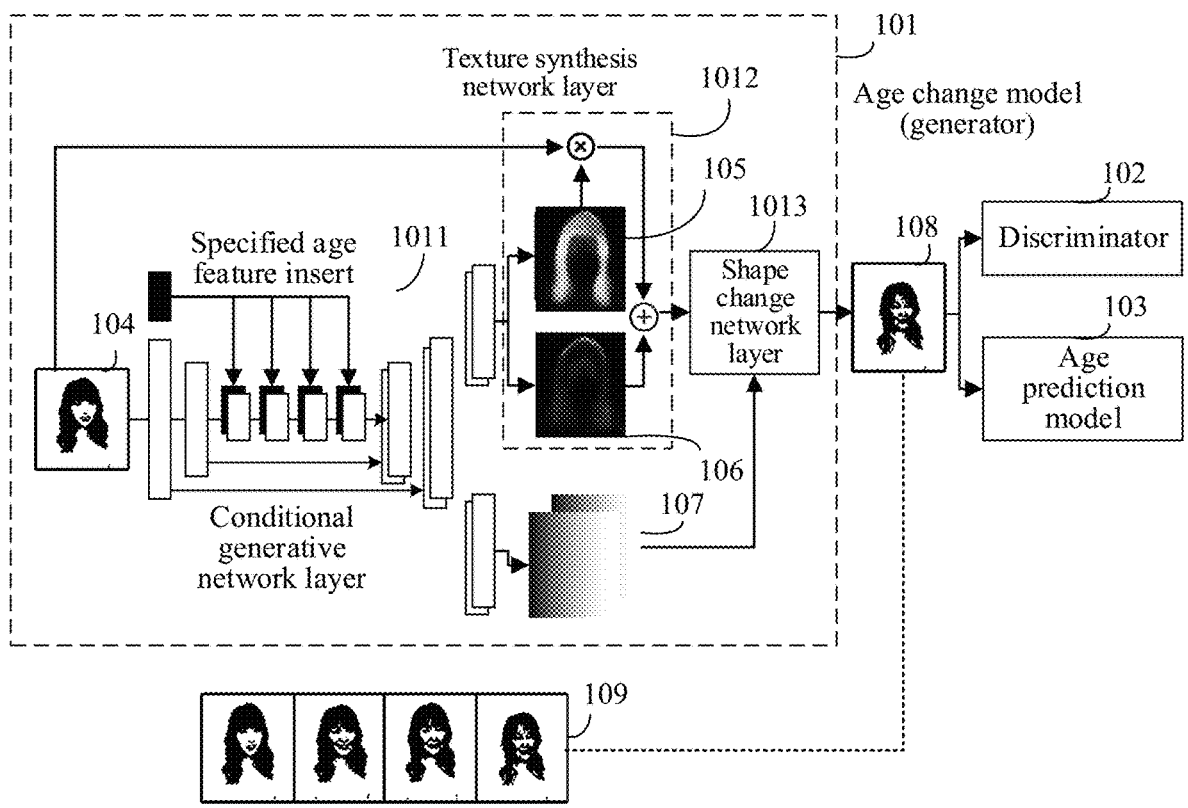
FIG. 1 is a schematic structural diagram of an age change model provided according to one exemplary embodiment of this disclosure.

FIG. 1 is a schematic structural diagram of an age change model 101 provided in one exemplary embodiment of this disclosure. As shown in FIG. 1, the age change model 101 includes a conditional generative network layer 1011, a texture synthesis network layer 1012 and a shape change network layer 1013.

A terminal or client can output a texture difference map 105, an attention map 106 and a shape change information map 107 according to an inputted first face image 104 and a specified age through the conditional generative network layer 1011. The terminal or client is configured to provide a function of changing, based on a specified age, a face image, and the age change model 101 can be invoked by the terminal or client. The age change model 101 may be set in the terminal, or may be set in a server or implemented as a cloud service. Terminals and servers can be collectively referred to as computer device.

The texture difference map 105 is used for reflecting a texture difference between a face texture in the first face image 104 and a face texture of the face of the same person at the specified age. The attention map 106 is used for reflecting a weight coefficient of the texture difference corresponding to a pixel point in the first face image 104. The shape change information map 107 includes corresponding displacement information of the pixel point in the first face image 104 in a first direction and a second direction. The first direction and the second direction are perpendicular to each other (such as a horizontal direction and a perpendicular direction). The terminal or client invokes the texture synthesis network layer 1012 to superimpose, based on the attention map 106, the texture difference map 105 with the first face image 104 to obtain a second face image, and invokes the shape change network layer 1013 to perform, based on the displacement information in the first direction and the second direction, bilinear displacement on a pixel point in the second face image, so as to change the shape of a face in the second face image, thereby obtaining an outputted second face image 108. The terminal or client can output face images 109 of the first face image 104 at the different specified ages according to different specified ages and the first face image 104.

Alternatively, the terminal or client may also preprocess the first face image 104 before inputting the first face image 104 into the age change model 101, wherein the preprocessing includes inputting the first face image 104 into a face detection model and outputting a face alignment point in the first face image; and performing image matting on the first face image 104 according to the face alignment point and affine transformation to obtain an aligned first face image. The terminal or client also performs semantic image segmentation on the outputted second face image 108 to obtain a hair region in the outputted second face image; calculates a corresponding target color value of the pixel point in the hair region at the specified age in a mapping manner based on an original color value of a pixel point in the hair region; and replaces the original color value of the pixel point in the hair region by the target color value, thereby obtaining a second face image in which the hair color is dynamically changed based on the outputted second face image 108. During extraction of features of the first face image 104 through the conditional generative network layer 1011, the terminal or client may fuse the specified age into the features extracted by a plurality of feature extraction layers in the conditional generative network layer 1011.

The age change model 101 and the discriminator 102 can constitute a generative adversarial network. At this time, the age change model 101 can also be referred to as a generator in the generative adversarial network. During training of the generator, a computer device acquires a sample image and randomly generates a specified age, or takes an age corresponding to a sample image predicted by an age prediction model 103 as a specified age; and then invokes the generator (the age change model 101) to predict, based on the specified age, the sample image to obtain a predicted face image. The predicted face image is a face image of a face in the sample image at the specified age. For the process of predicting, according to the specified age, the predicted face image corresponding to the sample image, a reference may be made to the above-mentioned process of outputting the second face image 108 through the age change model 101, and descriptions thereof will be omitted in this application. The computer device then invokes the discriminator 102 to calculate an adversarial loss for predicting the face image, the adversarial loss being used for representing whether the predicted face image is a loss of a real face image; invokes the age prediction model 103 to predict a predicted age of the predicted face image, and calculates an age loss between the predicted age and the specified age, thereby training the generator based on the adversarial loss and the age loss; and determines the generator as the age change model 101 when a training end condition (such as the generator is converged stably) is satisfied. The computer device can invoke the age change model 101, the discriminator 102 and the age prediction model 103. The above-mentioned client can be installed in the computer device, and the computer device sends the trained age prediction model 103 to the client or the client invokes the age change model 101 through the computer device. Alternatively, the computer device may also preprocess the sample image before inputting the sample image into the generator, wherein the preprocessing includes inputting the sample image into a face detection model and outputting a face alignment point in the sample image; and perform image matting on the sample image according to the face alignment point and affine transformation to obtain an aligned sample image. The preprocessing for the sample image is the same as the preprocessing performed on the first face image 104 before the age change model 101 is used to process the first face image 104, so that the accuracy of model outputting can be improved, and the training difficulty is lowered.

The first face image is processed through the age change model, so that the second face image can be generated according to the specified age. The second face image is a face image of a face in the first face image at the specified age. That is, a face image can be changed according to a specified age customized by a user or a specified age set in a system, so that the flexibility and accuracy of processing of the face image in an age dimension are improved.

Figure 2:
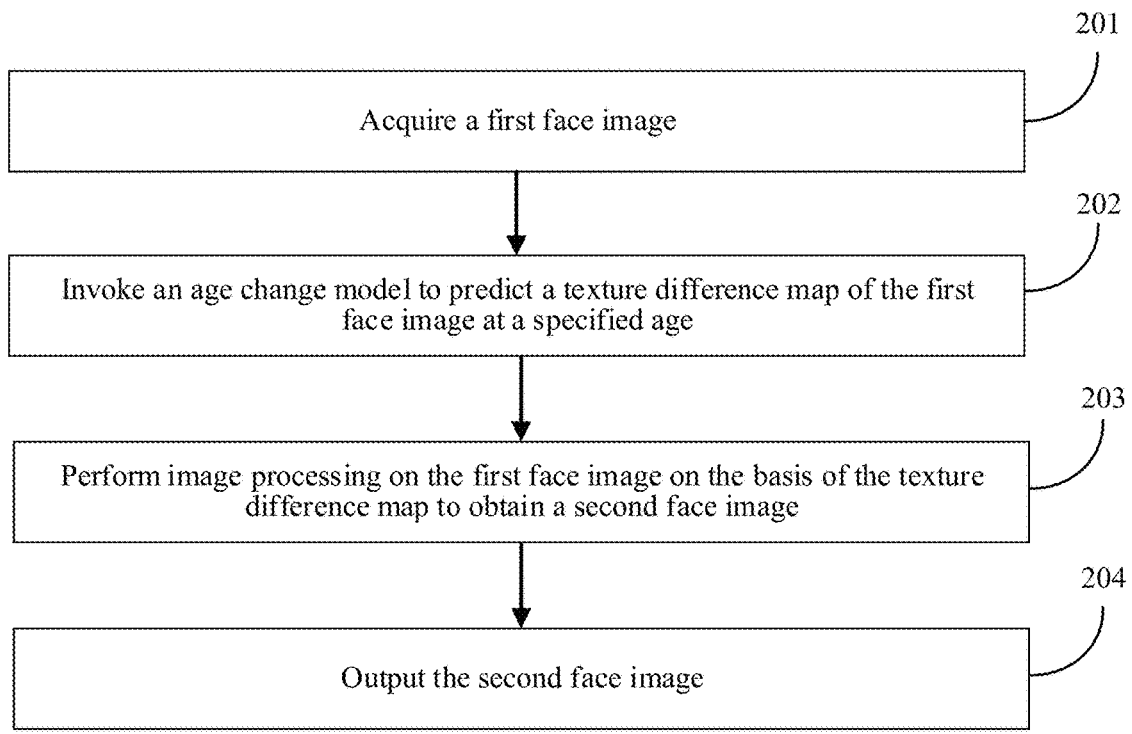
FIG. 2 is a schematic flowchart of an exemplary face image processing method provided according to an embodiment of this disclosure.

FIG. 2 is a schematic flowchart of a face image processing method provided according to an embodiment of this disclosure. The method can be applied to a computer device or a client on the computer device. As shown in FIG. 2, the method includes the following steps:

Step 201: Acquire a First Face Image

The first face image is from a photo or a video frame in a video. The first face image is any image including information of a face. Alternatively, the first face image includes facial features of the face, and a resolution of the first face image is 720P, 1080P, 4K and the like. The first face image is a photo or a video frame of a video uploaded by the user in the client, or a photo or a video frame in a video captured by the computer device where the client is located, or a photo or a video frame in a video acquired by the client through other computer devices.

This client is configured to provide a function of processing, based on a specified age, a face image. Exemplarily, the client is a short video client, a song client, a live streaming client, a social client, a game client, a mini program and a web client. A user uses this function by installing the client or by accessing a website corresponding to the client.

The client acquires the first face image by taking a photo or by reading photos or videos in a photo album, or receives the first face image transmitted by other devices. Alternatively, the client displays the first face image after acquiring the first face image.

Step 202: Invoke an Age Change Model to Predict a Texture Difference Map of the First Face Image at a Specified Age The specified age is determined by the client according to an operation of inputting the specified age by the user, or is generated by the client. Alternatively, the client acquires, according to a trigger operation of the user on an age change control displayed in a user interface that displays the first face image, the specified age, and invokes the age change model to process, based on the specified age, the first face image.

The texture difference map is used for reflecting a texture difference between a face texture in the first face image and a face texture of the specified age. The texture difference at least includes: a face skin feature difference, a hair color feature difference and a beard feature difference. When the specified age is greater than an age corresponding to a face in the sample image, the face skin feature difference is used for making the skin of the face smoother and finer; the hair color feature difference is used for blackening the hairs; and the beard feature difference is used for erasing the beards. When the specified age is less than the age corresponding to the face in the sample image, the face skin feature difference is used for adding wrinkles on the face; the hair color feature difference is used for whitening the hairs; and the beard feature difference is used for whitening the beards. For example, the age corresponding to the face in the first face image is 21, and the specified age is 50. The texture difference map includes texture information corresponding to the increased wrinkles, texture information corresponding to the whitened hairs, and texture information corresponding to the whitened beards.

Step 203: Perform Image Processing on the First Face Image Based on the Texture Difference Map to Obtain a Second Face Image The second face image is a face image of a face in the first face image at the specified age. The age corresponding to the face in the first face image is the same as or different from the specified age. For example, the user uploads an own photo at the age of 21 to the client, and inputs an age of 50 through the age change control. The client invokes the age change model to process the photo at the age of 21, so as to obtain a corresponding photo of the user at the age of 51 for the photo at the age of 21.

Alternatively, the second face image is obtained by performing, by the client based on the texture difference map, the image processing on the first face image through the age change model. The client also predicts a face shape change of the face in the first face image relative to the specified age through the age change model, and processes, based on the face shape change, the first face image, so as to obtain a more accurate second face image. For example, the age change model is based on a Convolutional Neural Network (CNN).

The age change model is deployed in the client, or in the computer device connected to the client. The computer device is a server, and may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. When the age change model is deployed in the computer device connected to the client, the client invokes the age change model through an age change model invoking interface provided by the computer device to process, based on the specified age, the first face image. Alternatively, the client sends the first face image and the specified age to the computer device, and the computer device invokes the age change model to process, based on the specified age, the first face image, and sends the obtained second face image to the client.

Step 204: Output the Second Face Image

The client may output the second face image, for example, display the second face image, after processing the first face image and obtaining the second face image. Alternatively, the client displays the first face image and the second face image in different user interfaces or in the same user interface. For example, the client displays the first face image and the second face image in the same display region in the user interface in a superimposed manner, and a switching display dividing line is also displayed in the display region. The client displays the first face image on one side of the switching display dividing line, and displays the second face image on the other side. In response to a moving operation on the switching display dividing line, display areas of the first face image and the second face image displayed by the client in the display region will change. Thus, the client can display user interfaces used for comparing differences of the first face image with the second face image.

Alternatively, the client may also display the specified age while displaying the second face image.

To sum up, according to the method provided by this embodiment of this disclosure, the first face image is processed through the age change model, so that the second face image can be generated and displayed according to the specified age. The second face image is a face image of a face in the first face image at the specified age. That is, a face image can be changed according to a specified age customized by a user or a specified age preset in a system, so that the flexibility and accuracy of processing of the face image in an age dimension are improved, and a clear and natural smooth transition change animation in all ages can also be achieved.

Figure 3:
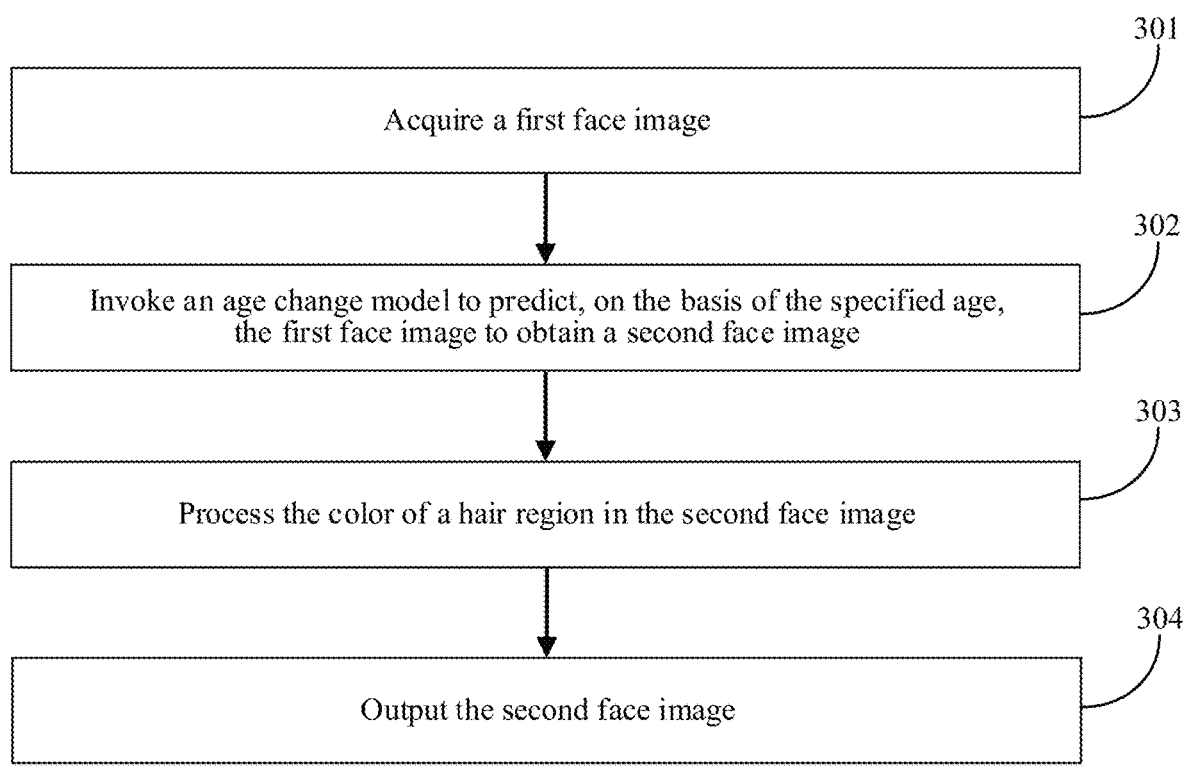
FIG. 3 is a schematic flowchart of another exemplary face image processing method provided according to an embodiment of this disclosure.

FIG. 3 is a schematic flowchart of a face image processing method provided according to an embodiment of this disclosure. The method can be applied to a computer device or a client on the computer device. As shown in FIG. 3, the method includes the following steps:

Step 301: Acquire a First Face Image

The first face image is from a photo or a video frame in a video. For example, the first face image is a photo or a video frame of a video uploaded by the user in the client, or a photo or a video frame in a video captured by the computer device where the client is located, or a photo or a video frame in a video acquired by the client through other computer devices. The client is configured to provide a function of processing, based on a specified age, a face image.

Step 302: Invoke an Age Change Model to Predict, Based on the Specified Age, the First Face Image to Obtain a Second Face Image The second face image is a face image of a face in the first face image at the specified age. The client invokes the age change model to predict a texture difference map of the first face image at the specified age, and performs, based on the texture difference map, image processing on the first face image to obtain the second face image. Or, the client invokes the age change model to predict a texture difference map of the first face image at the specified age and a face shape change of a face in the first face image relative to the specified age, and process, according to the texture difference map and the face shape change, the first face image, thereby obtaining the second face image. The texture difference map is used for reflecting a texture difference between a face texture in the first face image and a face texture of the specified age.

Alternatively, during the processing of the first face image, the client may also preprocess the first face image, including inputting the first face image into a face detection model, outputting a face alignment point in the first face image, and performing image matting on the first face image according to the face alignment point and affine transformation to obtain an aligned first face image. The face detection model is the same as a model used for preprocessing a sample image during the training of the age change model. The client performs the image matting on the first face image based on affine transformation through the warpAffine function (a public function interface used for achieving image rotation and translation). The client invokes the age change model to process, according to the specified age, the first face image after image matting, thereby obtaining the second face image corresponding to the first face image after image matting, and performs inverse transformation of the affine transformation on the second face image, thereby obtaining the second face image used for being outputted.

The age change model is integrated with an efficient network structure module (such as MobileNet and a CBAM module), and the performance of the age change model is optimized using a model compression pruning technique and engineering optimization. A storage space occupied by the age change model is reduced, and the speed of processing the first face image by the age change model can be increased.

Figure 4:
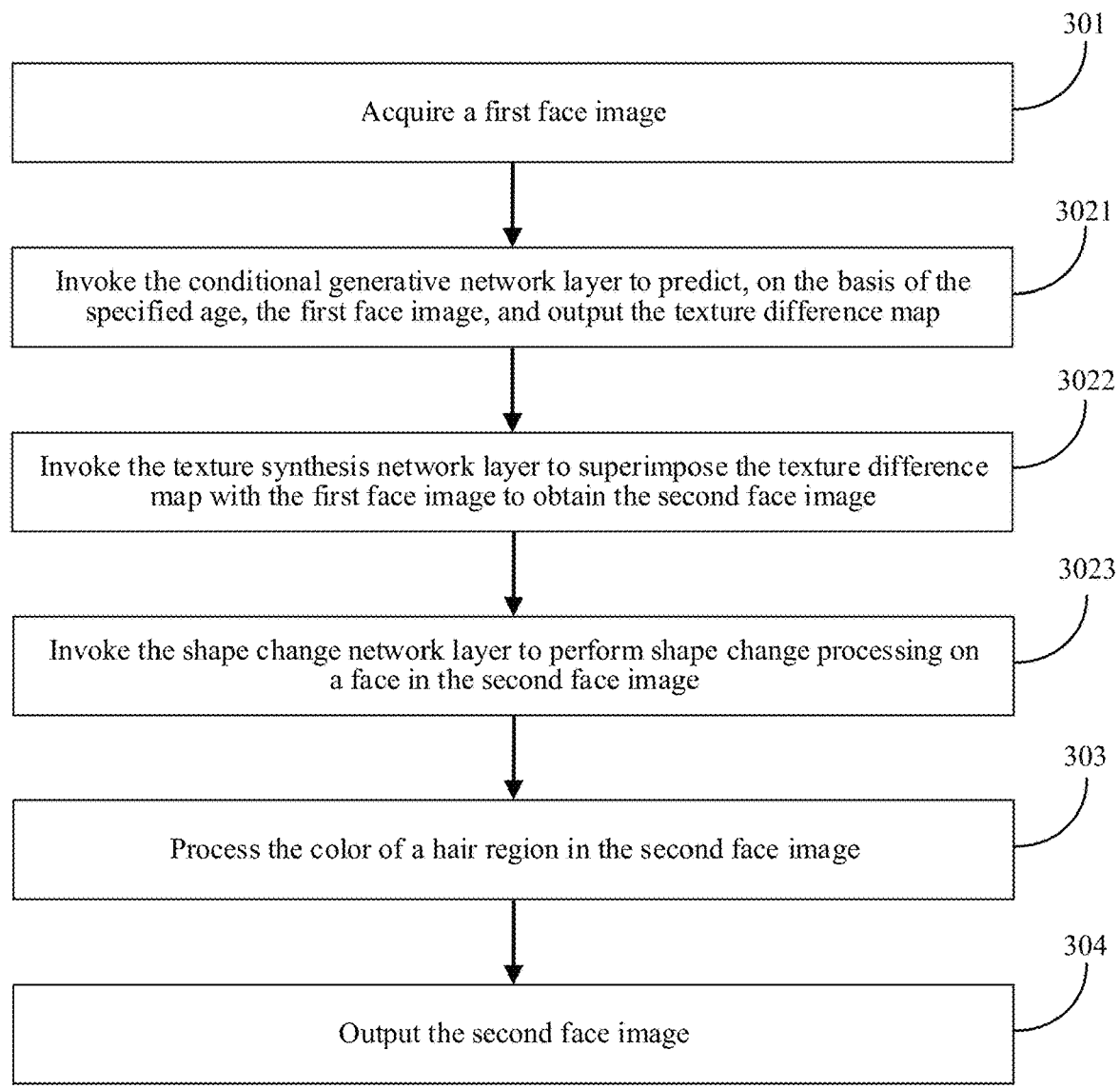
FIG. 4 is a schematic diagram of an exemplary implementation process of processing a first face image according to a specified age provided according to an embodiment of this disclosure.

Alternatively, the age change model includes a conditional generative network layer and a texture synthesis network layer. The age change model can further include a shape change network layer. As shown in FIG. 4, an implementation process of step 302 includes following step 3021 to step 3023:

Step 3021. Invoke the Conditional Generative Network Layer to Perform Prediction on the First Face Image According to the Specified Age, and Output the Texture Difference Map The texture difference map is used for reflecting a texture difference between a face texture in the first face image and a face texture of the specified age. The texture difference at least includes at least one of a face skin feature difference, a hair color feature difference and a beard feature difference. In a process of extracting features of the first face image through the conditional generative network layer to predict and obtain the texture difference map, the client may fuse the specified age into the features extracted by a plurality of feature extraction layers in the conditional generative network layer, thereby improving the accuracy of the outputted texture difference.

Step 3022. Invoke the Texture Synthesis Network Layer to Superimpose the Texture Difference Map with the First Face Image to Obtain the Second Face Image Alternatively, the conditional generative network layer is further used for outputting an attention map; and the attention map is used for reflecting a weight coefficient of the texture difference corresponding to a pixel point in the first face image. The client invokes the texture synthesis network layer to superimpose the texture difference map with the first face image based on the attention map, to obtain the second face image. Alternatively, when the texture difference map is superimposed with a sample image based on the attention map, a pixel point in the texture difference map, a pixel point in the first face image, a pixel point in the second face image and the weight coefficient determined according to the attention map satisfy:

$$I_{out}=I_{RGB}\times\alpha+I_{in}\times(1-\alpha)$$

where $I_{RGB}$ is the pixel point in the texture difference map; $I_{in}$ is the pixel point in the first face image; $I_{out}$ is the pixel point in the second face image; and $\alpha$ is the weight coefficient determined according to the attention map.

Step 3023. Invoke the Shape Change Network Layer to Perform Shape Change Processing on the Face in the Second Face Image Alternatively, the conditional generative network layer is further used for outputting a shape change information map; and the shape change information map is used for predicting a face shape change of the face in the first face image relative to the specified age. The client can invoke the shape change network layer to perform, based on the shape change information map, shape change processing on the face in the second face image.

Alternatively, the shape change information map includes displacement information corresponding to the pixel point in a first direction and a second direction. The first direction and the second direction are perpendicular to each other. The client invokes the shape change network layer to perform, based on the displacement information in the first direction and the second direction, bilinear displacement on the pixel point in the second face image, so as to perform the shape change processing on the second face image.

For example, the first face image includes three channels (red, green and blue) if it is an RGB image. The texture difference map outputted by the conditional generative network layer based on the first face image also includes three channels (red, green and blue); the attention map includes one channel (weight coefficient); and the shape change information map includes two channels (displacement information in the first direction and displacement information in the second direction).

Figure 5:
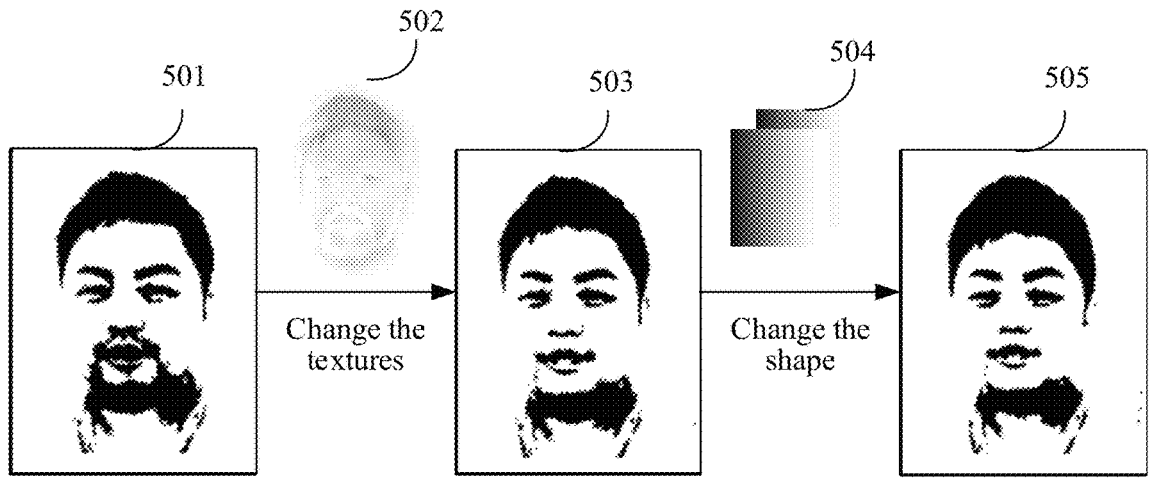
FIG. 5 is a schematic diagram of an exemplary process of processing a first face image provided according to an embodiment of this disclosure.

For example, FIG. 5 is a schematic diagram of a process of processing a first face image provided according to an embodiment of this disclosure. As shown in FIG. 5, the client invokes the conditional generative network layer in the age change model to process, based on the specified age, a first face image 501, so that a texture difference map 502, a shape change information map 504 and an attention map can be obtained. The client superimposes the first face image 501 with the texture difference map 502 based on the attention map through the texture synthesis network layer, so that a texture-changed second face image 503. The client then performs shape change processing on the texture-changed second face image 503 based on the shape change information map 504 through the shape change network layer to obtain a shape-changed second face image 505.

The client processes the first face image through the age change model, so that the second face image obtained by changing the textures can be outputted only, or, the second face image obtained by changing the textures and the shape can be outputted.

Step 303: Process the Color of a Hair Region in the Second Face Image

The second face image is the second face image obtained by changing the textures or is the second face image obtained by changing the textures or the shape. In order to ensure that the hair color of the face in the outputted second face image is more realistic, the client will also process the color of the hair region in the second face image, specifically including:

performing semantic image segmentation on the second face image to obtain the hair region in the second face image. After the client performs the semantic image segmentation on the second face image, an image mask corresponding to the hair region can be obtained. In the image mask, a value of a pixel point of the hair region in the second face image is 1, and a value of a pixel point of a region beyond the hair region is 0. The hair region can be obtained by multiplying the image mask with the second face image. The client then calculates, in a mapping manner, a target color value of a pixel point in the hair region at the specified age, based on an original color value of the pixel point in the hair region, and replaces the original color value of the pixel point in the hair region by the target color value, thereby obtaining a hair color-changed second face image. Alternatively, the client calculates the target color value in the mapping manner according to the original color value and the specified age through a conditional LUT. This condition means that the original color value corresponds to different target color value at different ages.

Step 304: Output the Second Face Image

The client outputs the second face image. For example, the client displays the second face image in a user interface that displays the first face image and the age change control, that is, the client displays the first face image and the second face image in the same user interface. Or, the client displays the first face image and the second face image in different user interfaces. Alternatively, the client may also display the specified age corresponding to the second face image in the user interface that displays the second face image.

To sum up, according to the method provided by this embodiment of this disclosure, the first face image is processed through the age change model, so that the second face image can be generated and displayed according to the specified age. The second face image is a face image of a face in the first face image at the specified age. That is, a face image can be changed according to a specified age customized by a user or a specified age preset in a system, so that the flexibility and accuracy of processing of the face image in an age dimension are improved.

In addition, both the texture change processing and the shape change processing are respectively performed on the first face image, and the texture difference map is superimposed with an inputted original image, so that the definition of the outputted face image can be maintained. The hair color processing is then performed on the texture-changed and shape-changed face image, so that the hair color of the finally outputted face image can be more realistic and natural, and the hair color of the face image matches with the specified age.

Figure 6:
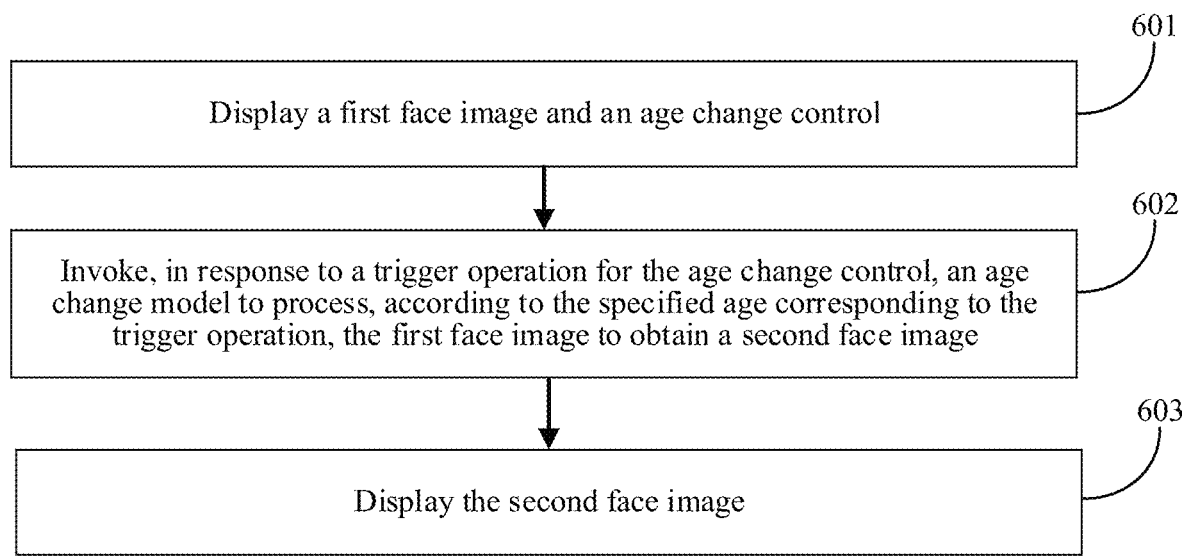
FIG. 6 is a schematic flowchart of an exemplary face image display method provided according to an embodiment of this disclosure.

FIG. 6 is a schematic flowchart of a face image display method provided according to an embodiment of this disclosure. The method can be applied to a computer device or a client on the computer device. As shown in FIG. 6, the method includes the following steps:

Step 601: Display a First Face Image and an Age Change Control

The first face image is from a photo or a video frame in a video. The first face image is any image including information of a face. For example, the first face image is a photo or a video frame of a video uploaded by the user in the client, or a photo or a video frame in a video captured by the computer device where the client is located, or a photo or a video frame in a video acquired by the client through other computer devices. The client is configured to provide a function of processing, based on a specified age, a face image.

The age change control is a control used for inputting a specified age. For example, the age change control includes an age input box; the age control includes an age selection box, or the age control includes an age display bar and elements that are superimposed on the age display bar to indicate specified ages.

The client displays the first face image and the age change control in the same user interface. The user interface is used for providing a function of processing, according to the specified age, the first face image. An image uploading control is also displayed in the user interface and is used for uploading the first face image.

Figure 7:
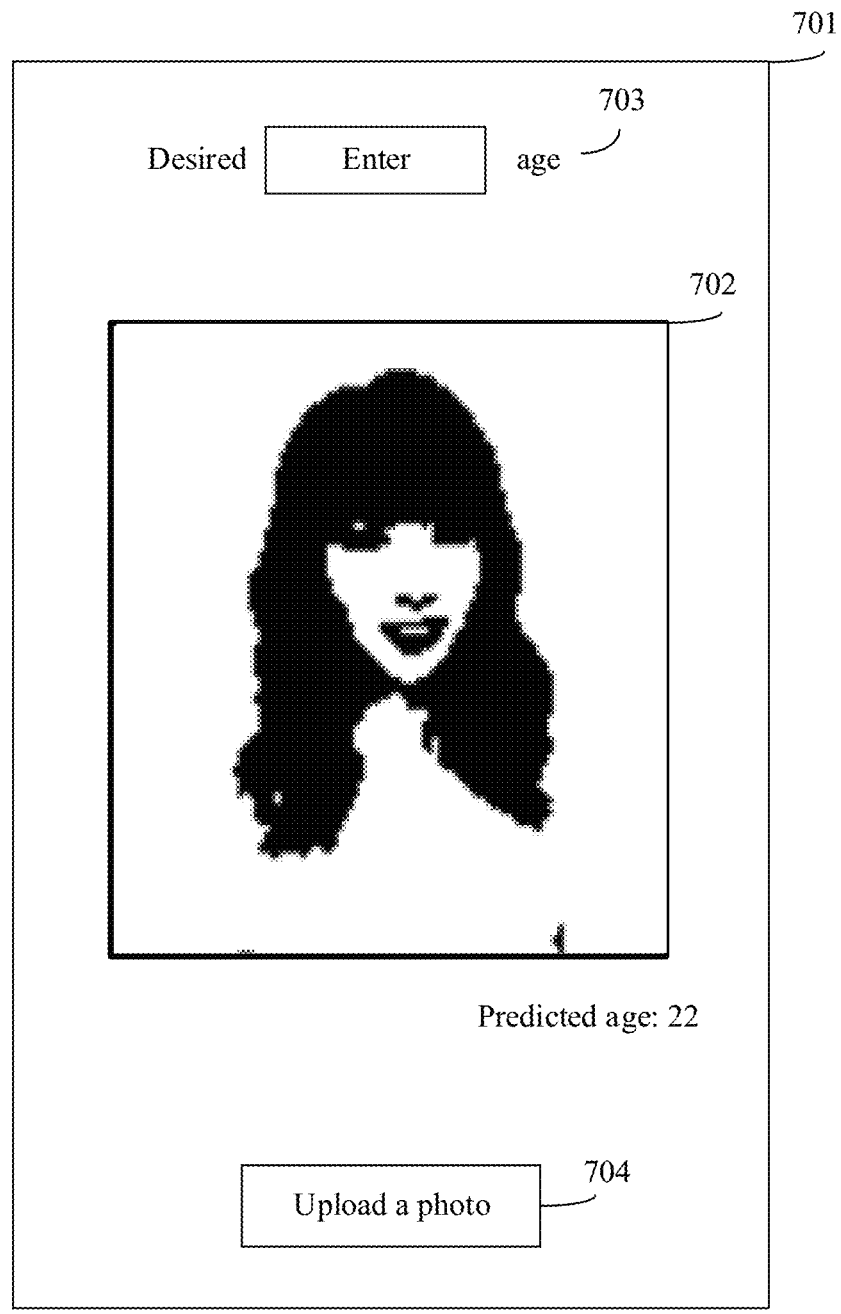
FIG. 7 is a schematic diagram of an exemplary user interface for displaying a first face image and an age change control provided according to an embodiment of this disclosure.

For example, FIG. 7 is a schematic diagram of a user interface for displaying a first face image and an age change control provided according to an embodiment of this disclosure. As shown in FIG. 7, a first face image 702 uploaded by a user through an image uploading button 704 is displayed in a first user interface 701. The first user interface 701 is a user interface, used for providing a function of processing, based on a specified age, a face image, in a client. An age inputting box 703 is also displayed in the first user interface 701. The client can acquire the specified age according to an inputting operation on the age inputting box 703.

Figure 8:
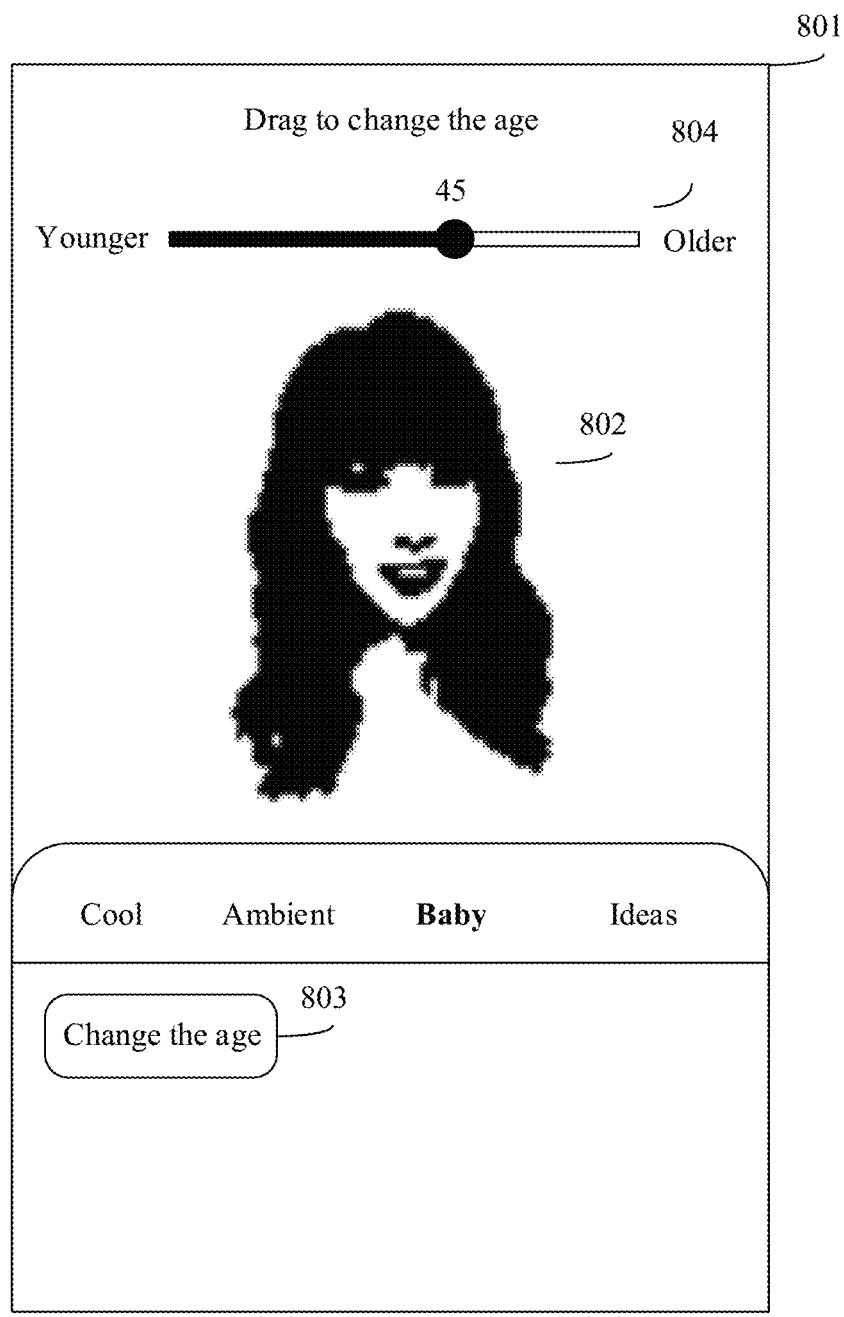
FIG. 8 is a schematic diagram of an exemplary user interface for displaying a first face image and an age change control provided according to an embodiment of this disclosure.

For example, FIG. 8 is a schematic diagram of another user interface for displaying a first face image and an age change control provided according to an embodiment of this disclosure. As shown in FIG. 8, a video frame 802 of a video captured in real time by a computer device where a client is located is displayed in a second user interface 801, and the video frame 802 includes an image of a face. The second user interface 801 is a user interface, used for processing the video captured in real time, in the client. When the client receives a single-click operation on an age change function button 803 in the second user interface 801, the client may display an age seek bar 804. The client can acquire, according to a drag operation on an element used for indicating a selected specified age on the age seek bar 804, a specified age, and displays the specified age above this element.

Step 602: Process, in Response to a Trigger Operation for the Age Change Control, the First Face Image According to the Specified Age Corresponding to the Trigger Operation to Obtain a Second Face Image The second face image is a face image of a face in the first face image at the specified age. When the client receives the trigger operation for the age change control, the client may invoke an age change model using the method in the above-mentioned embodiment to process, according to the specified age, the first face image to obtain the second face image. The age change model may be the age change model mentioned in the above-mentioned embodiments.

Alternatively, the age change control further includes a confirm control when the age change control includes an age inputting box. When the client receives a trigger operation on the confirm control, the client may acquire a specified age inputted into the inputting box and confirm that the trigger operation has been received. The age change control also includes a confirm control when the age control includes an age selection box. When the client receives a trigger operation on the confirm control, the client may acquire a specified age selected through the selection box and confirm that the trigger operation has been received. Or, when the age control includes an age display bar and an element which is superimposed on the age display bar and used for indicating a specified age, and the client receives a trigger operation (such as dragging to the left or right) on the element used for indicating a specified age, the client may acquire the specified age indicated by the element and confirm that the trigger operation has been received.

For example, a continuous reference is made to FIG. 7. When the client receives an inputting operation for the age inputting box 703, the client acquires the specified age inputted through the inputting operation, and invokes the age change model to process, according to the specified age, the first face image.

For example, a continuous reference is made to FIG. 8. When the client receives the drag operation on the element used for indicating the selected specified age on the age seek bar, the client acquires the specified age currently indicated by the element, and invokes the age change model to process, according to the specified age, the first face image.

Step 603: Display the Second Face Image

The client displays the second face image in a user interface that displays the first face image and the age change control, that is, the client displays the first face image and the second face image in the same user interface. Or, the client displays the first face image and the second face image in different user interfaces. Alternatively, the client may also display the specified age corresponding to the second face image in the user interface that displays the second face image.

Figure 9:
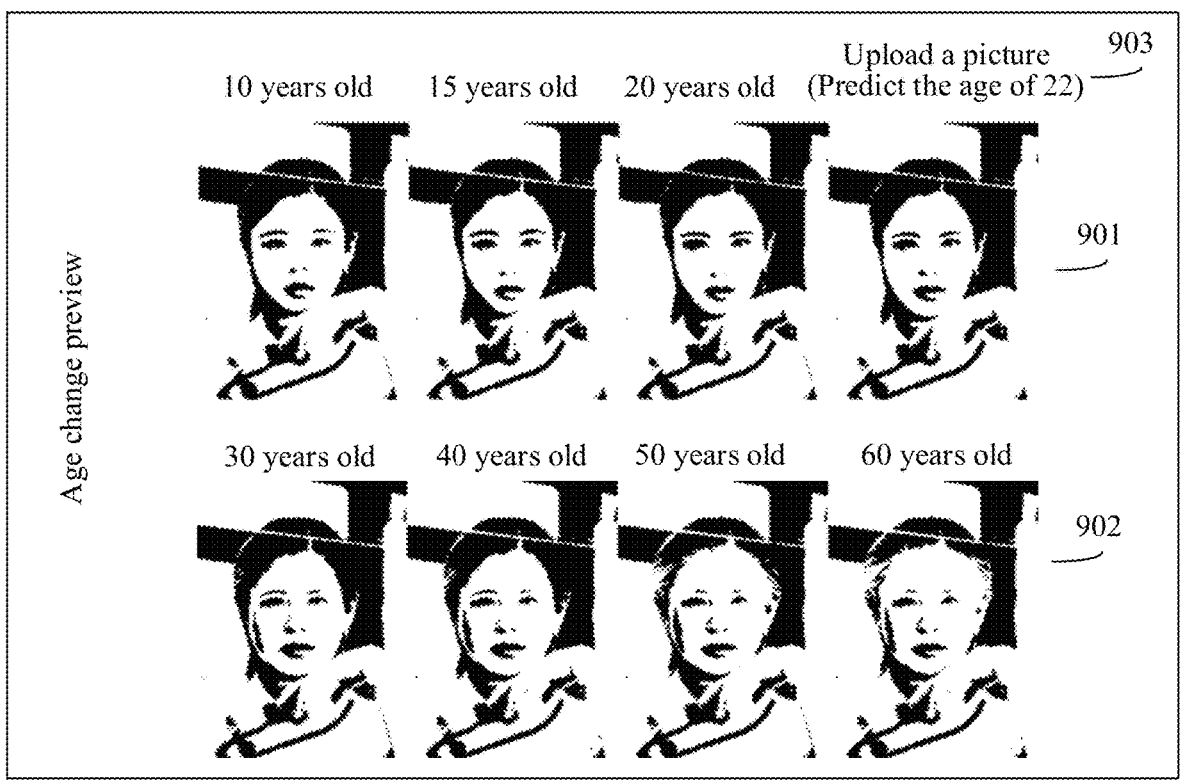
FIG. 9 is a schematic diagram of a second exemplary face image provided according to an embodiment of this disclosure.

For example, FIG. 9 is a schematic diagram of a displayed second face image provided according to an embodiment of this disclosure. As shown in FIG. 9, a client invokes, according to a first face image 901 uploaded by a user, an age change model to process, based on a plurality of preset specified ages, the first face image, thereby obtaining a plurality of face images 902 of the first face image 901 at different specified ages. Furthermore, the client may also display ages 903, corresponding to a face in the face image, above each face image displayed.

Figure 10:
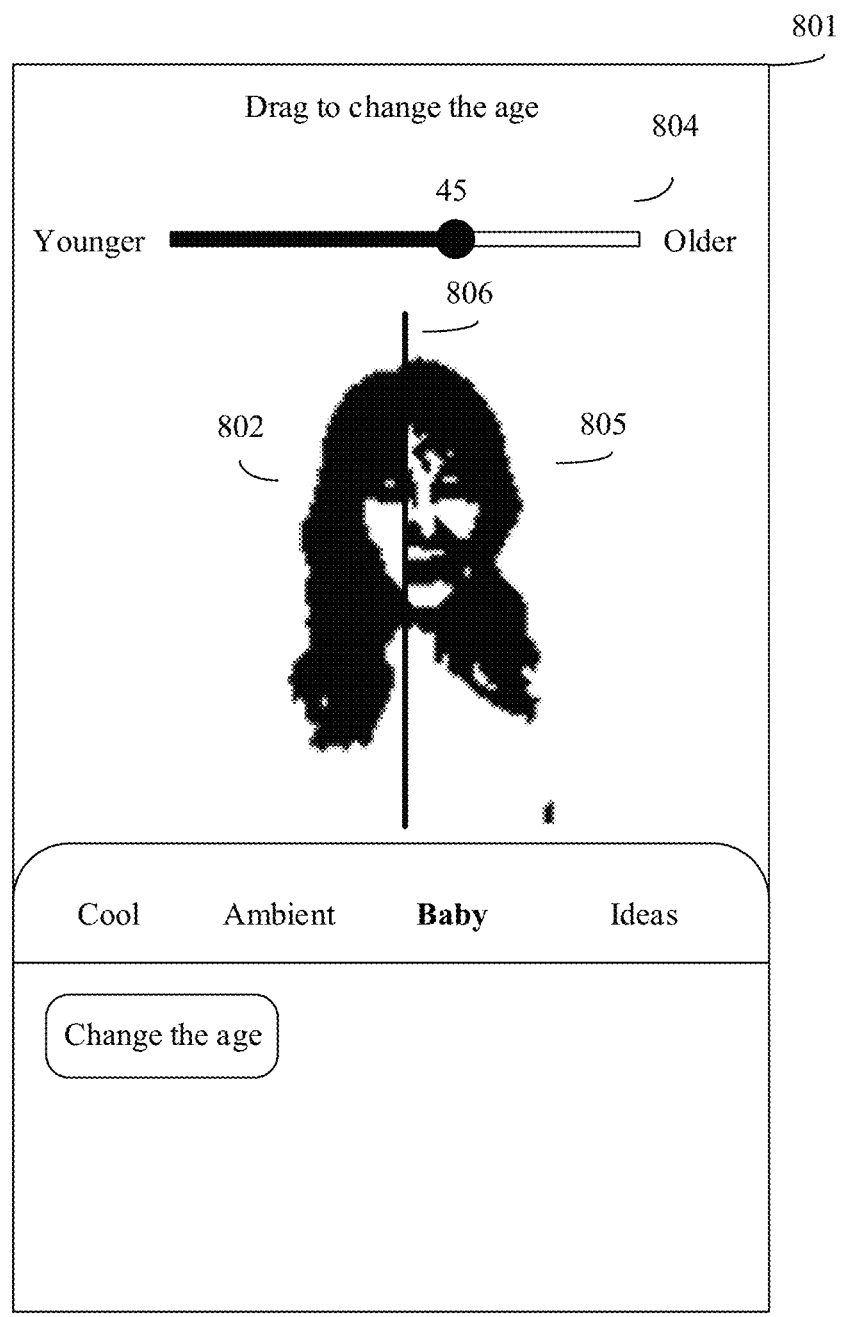
FIG. 10 is a schematic diagram of an exemplary user interface for displaying a second face image provided according to an embodiment of this disclosure.

For example, FIG. 10 is a schematic diagram of a user interface for displaying a second face image provided according to an embodiment of this disclosure. As shown in FIG. 10, a video frame 802 of a video captured in real time by a computer device where a client is located is displayed in a second user interface 801, and the video frame 802 includes an image of a face. The client acquires a specified age through the age seek bar 804, invokes the age change model to process the video frame 802 to obtain a target video frame 805, and displays the video frame 802 and the target video frame 805 in a superimposed manner. The target video frame 805 includes an image of a face obtained by processing the image of the face in the video frame 802. A switching display dividing line 806 is also displayed in the second user interface 801. The client displays the video frame 802 on the left side of the switching display dividing line 806, and displays the target video frame 805 on the other side. In response to a drag operation on the switching display dividing line 806, display areas of the video frame 802 and the target video frame 805 which are displayed on the client will change. For example, when the switching display dividing line 806 is dragged to the left, the area of the video frame 802 displayed on the client decreases, and the area of the target video frame 805 displayed increases. When the switching display dividing line 806 is dragged to the right, the area of the video frame 802 displayed on the client increases, and the area of the target video frame 805 displayed decreases.

To sum up, according to the method provided by this embodiment of this disclosure, in response to the trigger operation for the age change control, the first face image is processed through the age change model according to the specified age, so that the second face image of the face in the first face image at the specified age can be obtained and displayed. That is, a face image can be changed according to a specified age customized by a user or a specified age preset in a system, so that the flexibility and accuracy of processing of the face image in an age dimension are improved.

Figure 11:
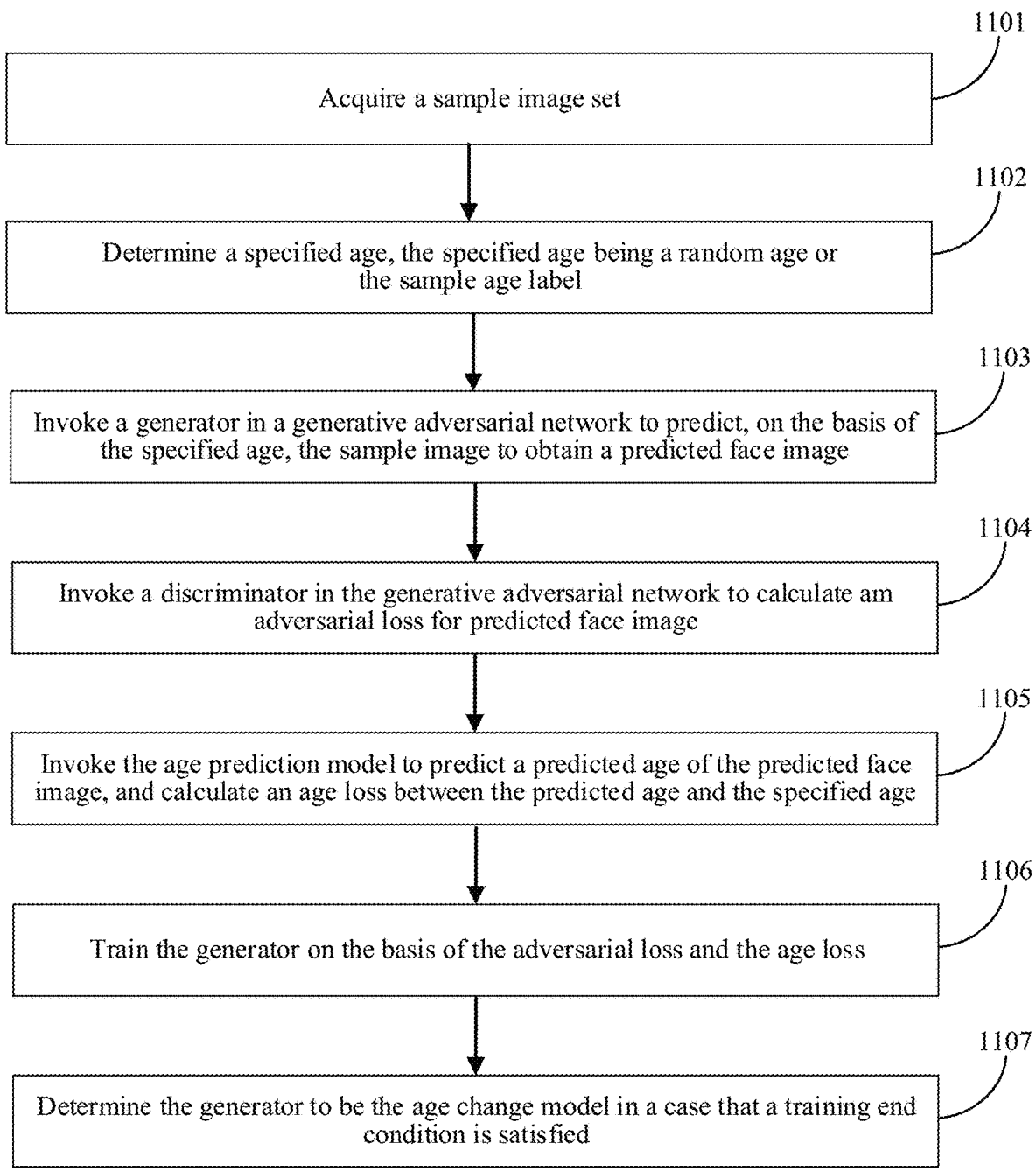
FIG. 11 is a schematic flowchart of an exemplary age change model training method provided according to an embodiment of this disclosure.

FIG. 11 is a schematic flowchart of an age change model training method provided according to an embodiment of this disclosure. The method can be applied to a computer device or a client on the computer device. As shown in FIG. 11, the method includes the following steps:

Step 1101. Acquire a Sample Image Set

The sample image set includes a sample image and a sample age label of the sample image. Alternatively, the sample image set includes sample images of different faces. The sample image set is determined by an administrator providing a face image processing service. The computer device trains an age change model according to the sample image set. The age change model is deployed in the computer device, or the computer device can remotely invoke the age change model.

In some implementations, the sample image set may include a plurality of pairs of sample image and corresponding sample age sample. In this case, the training process as described below will apply to each of the plurality of pairs.

The computer device predicts the age of the sample image through an age prediction model, so as to obtain the sample age label. The age prediction model is based on a convolutional neural network (CNN), and is trained by samples of face images of different ages and identities and known ages corresponding to the face images.

Step 1102: Determine a Specified Age, the Specified Age being a Random Age or the Sample Age Label When the specified age is the random age, the specified age is randomly generated by the computer device. For example, the computer device randomly generates a number between 10 and 80, and determines it as the specified age. Alternatively, the computer device can also acquire an age selected by the administrator and take it as the specified age.

Step 1103: Invoke a Generator in a Generative Adversarial Network to Predict, Based on the Specified Age, the Sample Image to Obtain a Predicted Face Image The predicted face image is a face image of a face in the sample image at the specified age. The generator in the generative adversarial network is the age change model. Alternatively, the computer device invokes the generator to predict a texture difference map of the sample image at the specified age, and performs, based on the texture difference map, image processing on the sample image to obtain the predicted face image. Or, the computer device invokes the generator to predict a texture difference map of the sample image at the specified age and a face shape change of the face in the sample image relative to the specified age, and processes, according to the texture difference map and the face shape change, the sample image to obtain the predicted face image. The texture difference map is used for reflecting a texture difference between a face texture in the sample image and a face texture of the specified age. The generator is based on the CNN.

Step 1104: Invoke a Discriminator in the Generative Adversarial Network to Calculate an Adversarial Loss for Predicted Face Image The generator and the discriminator constitute the generative adversarial network. The discriminator is used for determining whether an inputted image is an image generated by the generator or a real image, thereby forming an adversarial relationship with the generator. The computer device inputs the predicted face image into the discriminator, and obtains a determination on whether the predicted face image predicted by the discriminator is a real image, thereby calculating the adversarial loss. The adversarial loss is used for whether the predicted face image is a loss of a real face image. The computer device may also input the sample image into the discriminator, and trains, according to the determination outputted by the discriminator on whether the sample image is a real time, the discriminator. The discriminator is based on the CNN.

Step 1105: Invoke the Age Prediction Model to Predict a Predicted Age of the Predicted Face Image, and Calculate an Age Loss Between the Predicted Age and the Specified Age The age prediction model is the same as or different from the age prediction model used for predicting the sample age label. The computer device inputs the predicted face image into the age prediction model, outputs the predicted age predicted for the face in the predicted face image, and calculates, according to the predicted age and the specified age, the age loss. The age loss can reflect a deviation between the predicted age and the specified age.

Step 1106: Train the Generator According to the Adversarial Loss and the Age Loss The computer device trains, according to the adversarial loss, the generator using gradient backpropagation, and trains, according to the age loss, the generator using gradient backpropagation. The computer device trains the generator alternately, or simultaneously, according to the adversarial loss and the age loss. The generator can generate an image that is closer to the real face image by the adversarial loss, and the age reflected by the face in the face image generated by the generator has a smaller deviation from the specified age by the age loss.

Step 1107: Determine the Generator to be the Age Change Model in a Case that a Training End Condition is Satisfied The training end condition includes parameters of the generator obtained by adjusting, based on backpropagation, the adversarial loss and the age loss, so that the generator can be stabilized and converged. Or, the training end condition is determined by the administrator training the generator. The above-mentioned discriminator and age prediction model are mainly used for the computer device to train the generator. When the training of the generator is completed, the computer device acquires the trained generator and determines it to be the age change model.

After completing the training of the age change model, the computer device may set the age change model in the client, or provide an invoking interface of the age change model to the outside, so that a service of processing a face image based on a specified age is provided to the outside. Alternatively, the computer device is a server, and may further be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The computer device training the age change model is the same as or different from the computer device where the client is installed.

To sum up, in the method provided by this embodiment of this disclosure, the generator is trained by the sample image set and the specified age, thereby obtaining the age change model. The age change model is trained based on the adversarial loss and the age loss. A face image can be changed according to a specified age customized by a user or a specified age preset in a system, so that the flexibility and accuracy of processing of the face image in an age dimension are improved.

Figure 12:
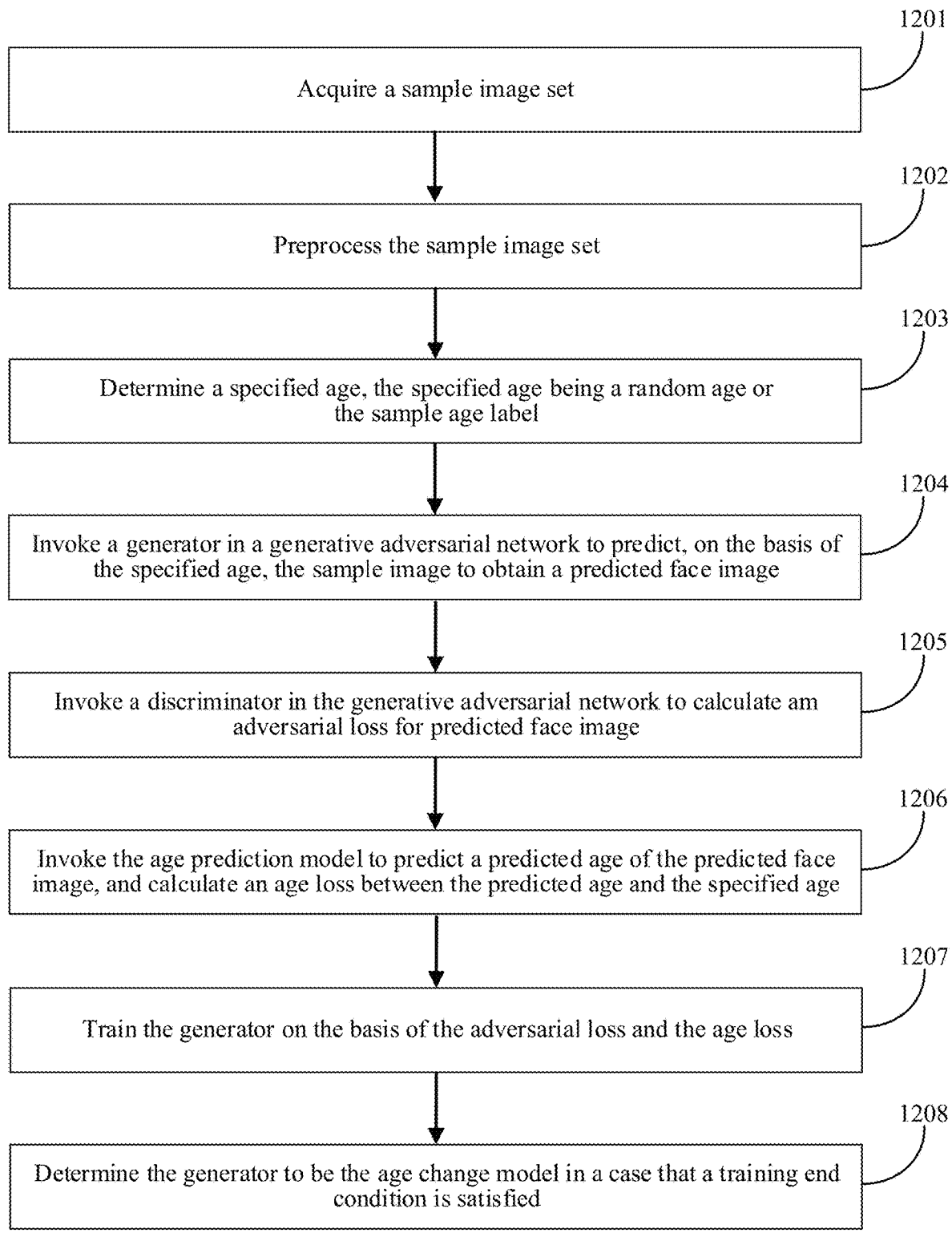
FIG. 12 is a schematic flowchart of another exemplary age change model training method provided according to an embodiment of this disclosure.

FIG. 12 is a schematic flowchart of another age change model training method provided according to an embodiment of this disclosure. The method can be applied to a computer device or a client on the computer device. As shown in FIG. 12, the method includes the following steps:

Step 1201. Acquire a Sample Image Set

The sample image set includes a sample image and a sample age label of the sample image. Alternatively, the sample image set includes sample images of different faces. The sample image set is determined by an administrator providing a face image processing service. The computer device trains an age change model according to the sample image set. The age change model is deployed in the computer device, or the computer device can remotely invoke the age change model.

The computer device invokes the age prediction model to perform age prediction on the sample image to obtain the sample image and the sample age label, and determines the sample image and the sample age label of the sample image to be the sample image set. The age prediction model is based on a CNN, and is trained by samples of face images of different ages and identities and known ages corresponding to the face images.

Step 1202. Preprocess the Sample Image Set

The computer device may input the sample image into a face detection model, output a face alignment point in the sample image, and perform image matting on the sample image according to the face alignment point and affine transformation to obtain an aligned sample image. The face detection model is used for determining features of the face included in the sample image, thereby obtaining the face alignment point that reflects face features. The face detection model is trained by a training sample including facial features. The face alignment point includes a pixel point, used for indicating the facial features, in the sample image. The computer device achieves image matting on the sample image based on affine transformation through the warpAffine function.

Step 1203: Determine a Specified Age, the Specified Age Being a Random Age or the Sample Age Label When the specified age is the random age, the specified age is randomly generated by the computer device. For example, the computer device randomly generates a number between 10 and 80, and determines it as the specified age. Alternatively, the computer device can also acquire an age selected by the administrator and take it as the specified age.

Step 1204: Invoke a Generator in a Generative Adversarial Network to Predict, Based on the Specified Age, the Sample Image to Obtain a Predicted Face Image The generator in the generative adversarial network is the age change model. The computer device invokes the generator to predict a texture difference between a face texture in the sample image and a face texture of the specified age, and performs, based on the texture difference, image processing on the sample image to obtain the predicted face image. Or, the computer device invokes the generator to predict a texture difference between a face texture in the sample image and a face texture of the specified age and a face shape change of the face in the sample image relative to the specified age, and processes, based on the face texture difference and the face shape change, the sample image to obtain the predicted face image.

Figure 13:
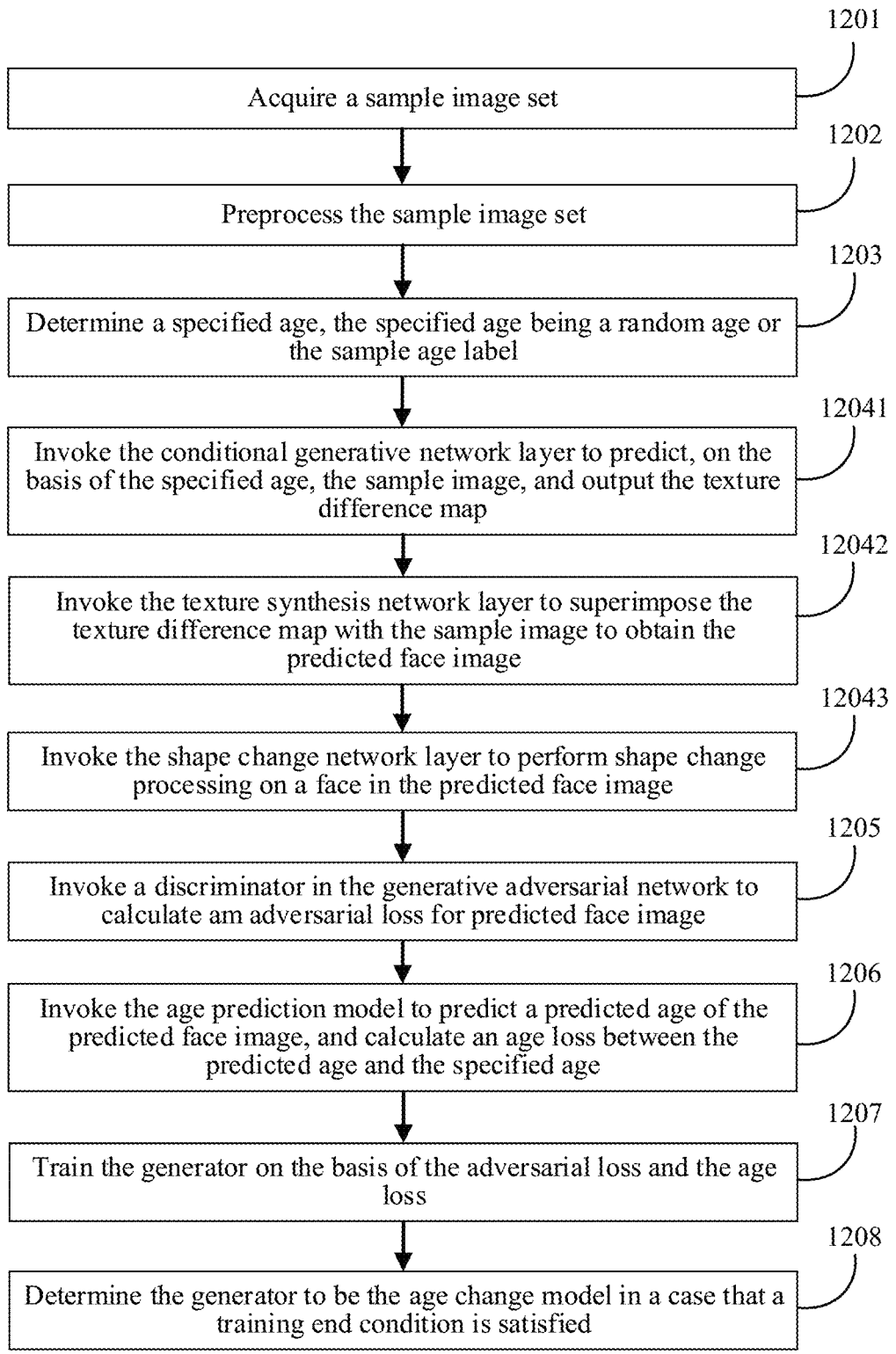
FIG. 13 is a schematic diagram of an exemplary implementation process of predicting a sample image provided according to an embodiment of this disclosure.

Alternatively, the generator includes a conditional generative network layer and a texture synthesis network layer. The generator can further include a shape change network layer. As shown in FIG. 13, an implementation process of step 1204 includes following step 12041 to step 12043:

Step 12041. Invoke the Conditional Generative Network Layer to Predict, Based on the Specified Age, the Sample Image, and Output the Texture Difference Map The texture difference map is used for reflecting the texture difference between the face texture in the sample image and the face texture of the specified age. The texture difference at least includes: a face skin feature difference, a hair color feature difference and a beard feature difference. When the specified age is greater than an age corresponding to a face in the sample image, the face skin feature difference is used for making the skin of the face smoother and finer; the hair color feature difference is used for blackening the hairs; and the beard feature difference is used for erasing the beards. When the specified age is less than the age corresponding to the face in the sample image, the face skin feature difference is used for adding wrinkles on the face; the hair color feature difference is used for whitening the hairs; and the beard feature difference is used for whitening the beards.

Step 12042. Invoke the Texture Synthesis Network Layer to Superimpose the Texture Difference Map with the Sample Image to Obtain the Predicted Face Image Alternatively, the conditional generative network layer is further used for outputting an attention map. The attention map is used for reflecting a weight coefficient of the texture difference corresponding to a pixel point in the sample image. The weight coefficient is used for reflecting the importance of the texture difference corresponding to the pixel point in the sample image in the texture differences corresponding to other pixel points.

The computer device invokes the texture synthesis network layer, so that the texture difference map and the sample image can be superimposed based on the attention map to obtain the predicted face image. Alternatively, when the texture difference map is superimposed with the sample image based on the attention map, a pixel point in the texture difference map, a pixel point in the sample image, a pixel point in the predicted face image and the weight coefficient determined according to the attention map satisfy:

$$I_{out} = I_{RGB} \times \alpha + I_{in} \times (1-\alpha)$$

where $I_{RGB}$ is the pixel point in the texture difference map; $I_{in}$ is the pixel point in the sample image; $I_{out}$ is the pixel point in the predicted face image; and α is the weight coefficient determined according to the attention map.

Step 12043. Invoke the Shape Change Network Layer to Perform Shape Change Processing on the Face in the Predicted Face Image Alternatively, the conditional generative network layer is further used for outputting a shape change information map; and the shape change information map is used for predicting a face shape change of the face in the sample image relative to the face at the specified age. The computer device can invoke the shape change network layer to perform, based on the shape change information map, shape change processing on the face in the predicted face image.

Alternatively, the shape change information map includes displacement information corresponding to the pixel point in the sample image in a first direction and a second direction. The predicted face image is obtained based on the sample image, and the shape change information map can also reflect displacement information corresponding to the pixel point in the predicted face image in the first direction and the second direction. The first direction and the second direction are perpendicular to each other. For example, the first direction is a vertical direction in the predicted sample image, and the second direction is a horizontal direction in the predicted sample image. The computer device invokes the shape change network layer to perform, based on the displacement information in the first direction and the second direction, bilinear displacement on the pixel point in the predicted face image, so as to perform the shape change processing on the predicted face image.

For example, the sample image includes three channels (red, green and blue) if it is an RGB image. The texture difference map outputted by the conditional generative network layer based on the sample image also includes three channels (red, green and blue); the attention map includes one channel (weight coefficient); and the shape change information map includes two channels (displacement information in the first direction and displacement information in the second direction).

Step 1205: Invoke a Discriminator in the Generative Adversarial Network to Calculate an Adversarial Loss for Predicted Face Image The computer device inputs the predicted face image into the discriminator, and obtains a determination on whether the predicted face image predicted by the discriminator is a real image, thereby calculating the adversarial loss. The adversarial loss is used for whether the predicted face image is a loss of a real face image. The computer device may also input the sample image into the discriminator, and trains, according to the determination outputted by the discriminator on whether the sample image is a real time, the discriminator.

Step 1206: Invoke the Age Prediction Model to Predict a Predicted Age of the Predicted Face Image, and Calculate an Age Loss Between the Predicted Age and the Specified Age The age prediction model is the same as or different from the age prediction model used for predicting the sample age label. The computer device inputs the predicted face image into the age prediction model, outputs the predicted age predicted for the face in the predicted face image, and calculates, according to the predicted age and the specified age, the age loss. The age loss can reflect a deviation between the predicted age and the specified age.

Step 1207: Train the Generator According to the Adversarial Loss and the Age Loss The computer device trains, according to the adversarial loss, the generator using gradient backpropagation, and trains, according to the age loss, the generator using gradient backpropagation. The computer device trains the generator alternately, or simultaneously, according to the adversarial loss and the age loss. The generator can generate an image that is closer to the real face image by the adversarial loss, and the age reflected by the face in the face image generated by the generator has a smaller deviation from the specified age by the age loss.

Step 1208: Determine the Generator to be the Age Change Model in a Case that a Training End Condition is Satisfied The training end condition includes parameters of the generator obtained by adjusting, based on backpropagation, the adversarial loss and the age loss, so that the generator can be stabilized and converged. Or, the training end condition is determined by the administrator training the generator. The above-mentioned discriminator and age prediction model are mainly used for the computer device to train the generator. When the training of the generator is completed, the computer device acquires the trained generator and determines it to be the age change model.

The computer device can only train the conditional generative network layer and the texture synthesis network layer, that is, train the generator according to the outputted predicted face image that is not subjected to the shape change processing. Or, the computer device trains the conditional generative network layer, the texture synthesis network layer and the texture synthesis network layer, that is, train the generator according to the outputted predicted face image that is subjected to the shape change processing. After completing the training of the age change model, the computer device may set the age change model in the client, or provide an invoking interface of the age change model to the outside, so that a service of processing a face image based on a specified age is provided to the outside.

To sum up, in the method provided by this embodiment of this disclosure, the generator is trained by the sample image set and the specified age, thereby obtaining the age change model. The age change model is trained based on the adversarial loss and the age loss. A face image can be changed according to a specified age customized by a user or a specified age preset in a system, so that the flexibility and accuracy of processing of the face image in an age dimension are improved.

In addition, the age change model is trained based on the generative adversarial network, so that the generated second face image is more natural. The age change model is trained based on the age prediction model, so that the face in the generated second face image is closer to the face of the specified age. Preprocessing of the sample image can lower the difficulty in training the age change model, thereby improving the training efficiency.

An order of the steps in the method provided in the embodiments of the present disclosure may be properly adjusted, a step may also be correspondingly added or omitted according to a condition, and variations readily figured out by a person skilled in the art within the technical scope disclosed in the present invention shall fall within the protection scope of the present invention. Therefore, details are not described again.

Figure 14:
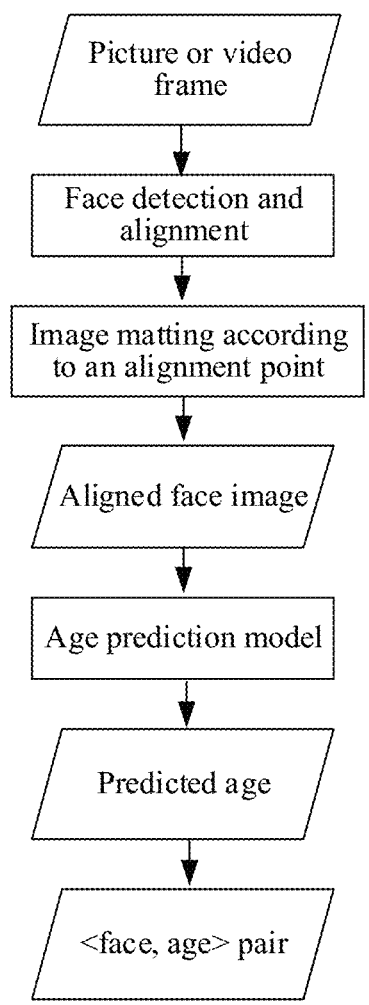
FIG. 14 is a schematic diagram of an exemplary implementation process of preprocessing a face image provided according to an embodiment of this disclosure.

In one specific example, FIG. 14 is a schematic diagram of an implementation process of preprocessing a face image provided according to an embodiment of this disclosure. As shown in FIG. 14, a client acquires a face image according to a picture or a video frame; determines, through a face detection model, a face alignment point in the face image to achieve detection and alignment for a face in the face image; perform, through the warpAffine function according to the face alignment point and affine transformation, image matting on the face image to obtain an aligned face image; and predicts, through an age prediction model, an age of the face image to obtain a combination of the face image and the predicted age. The face image and the predicted age can be used as a sample image and a sample age label to train an age change model.

Figure 15:
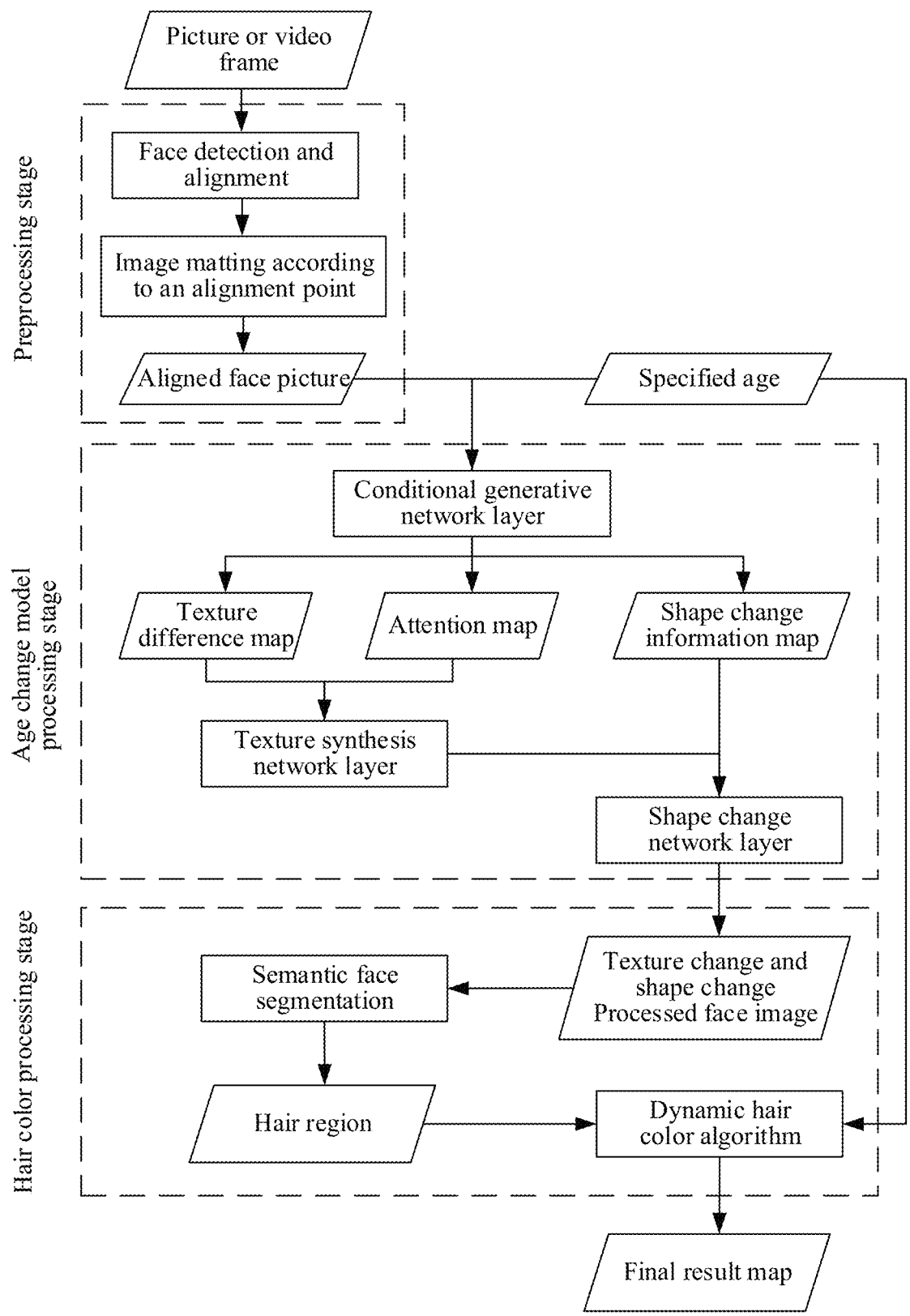
FIG. 15 is a schematic diagram of an exemplary implementation process of performing age change on a face image provided according to an embodiment of this disclosure.

FIG. 15 is a schematic diagram of an implementation process of performing age change on a face image provided according to an embodiment of this disclosure. As shown in FIG. 15, a client acquires a face image according to a picture or a video frame. At a preprocessing stage, the face image is preprocessed for face alignment, and a specified age is then acquired. At an age change model processing stage, the client invokes a conditional generative network layer to process, based on the specified age, the face image to obtain a texture difference map, an attention map and a shape change information map. The texture difference map and the face image are superimposed based on the attention map through the texture synthesis network layer, and shape change processing is performed on the outputted texture-changed face image based on the shape change information map through a shape change network layer. At a hair color processing stage, the client performs semantic face segmentation on the texture-changed and shape-changed face image to obtain a hair region, and replaces the color of a pixel point in the hair region based on a dynamic hair color algorithm (that is a conditional color LUT), thereby outputting a final result map.

Figure 16:
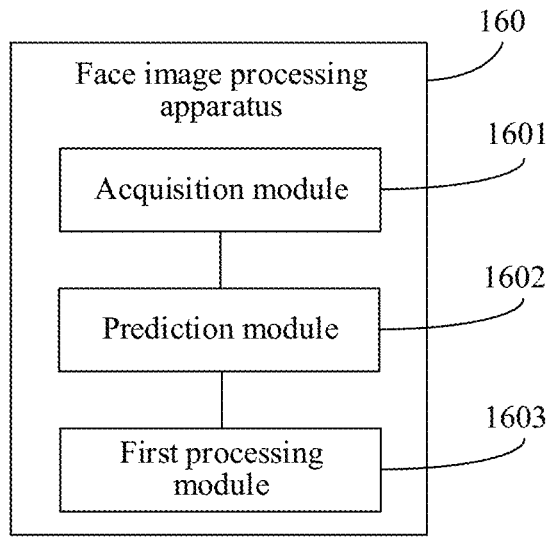
FIG. 16 is a schematic structural diagram of a face image processing apparatus provided according to an embodiment of this disclosure.

FIG. 16 is a schematic structural diagram of a face image processing apparatus provided according to an embodiment of this disclosure. In this disclosure, a unit and a module may be hardware such as a combination of electronic circuitries; firmware; or software such as computer instructions. The unit and the module may also be any combination of hardware, firmware, and software. In some implementation, a unit may include at least one module. The apparatus can be applied to a computer device or a client on the computer device. As shown in FIG. 16, the apparatus 160 includes:

an acquisition module 1601, configured to acquire a first face image;

a prediction module 1602, configured to invoke an age change model to predict a texture difference map of the first face image at a specified age, the texture difference map being used for reflecting a texture difference between a face texture in the first face image and a face texture of the specified age; and a first processing module 1603, configured to perform, based on the texture difference map, image processing on the first face image to obtain a second face image, the second face image being a face image of a face in the first face image at the specified age.

Alternatively, the age change model includes a conditional generative network layer and a texture synthesis network layer. The prediction module 1602 is configured to:

invoke the conditional generative network layer to predict, based on the specified age, the first face image, and output the texture difference map. The texture difference map is used for reflecting a texture difference between a face texture in the first face image and a face texture of the specified age.

The first processing module 1603 is configured to invoke the texture synthesis network layer to superimpose the texture difference map with the first face image to obtain the second face image.

Alternatively, the conditional generative network layer is further used for outputting an attention map; and the attention map is used for reflecting a weight coefficient of the texture difference corresponding to a pixel point in the first face image. The first processing module 1603 is configured to:

invoke the texture synthesis network layer to superimpose, based on the attention map, the texture difference map with the first face image to obtain the second face image.

Figure 17:
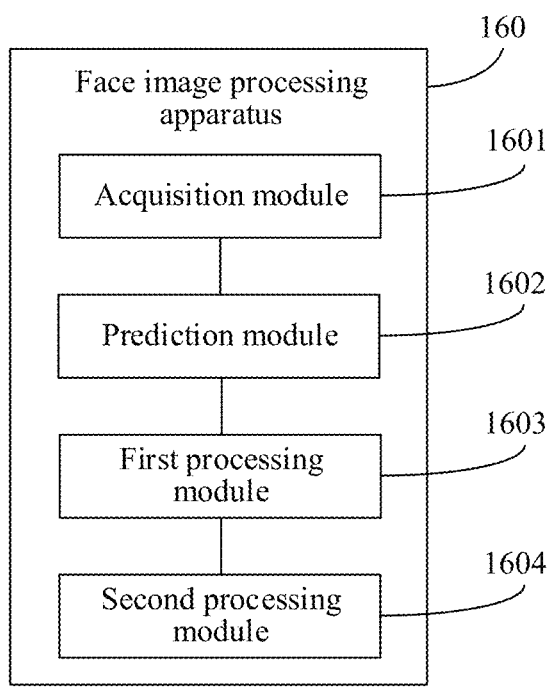
FIG. 17 is a schematic structural diagram of a face image processing apparatus provided according to an embodiment of this disclosure.

Alternatively, the age change model further includes a shape change network layer. As shown in FIG. 17, the apparatus 160 further includes:

a second processing module 1604, configured to invoke the shape change network layer to perform shape change processing on a face in the second face image.

Alternatively, the conditional generative network layer is further used for outputting a shape change information map; and the shape change information map is used for predicting a face shape change of the face in the first face image relative to the specified age. The second processing module 1604 is configured to:

invoke the shape change network layer to perform, based on the shape change information map, shape change processing on the face in the second face image.

Alternatively, the shape change information map includes displacement information corresponding to the pixel point in a first direction and a second direction, the first direction and the second direction being perpendicular to each other; The second processing module 1604 is configured to:

invoke the shape change network layer to perform, based on the displacement information in the first direction and the second direction, bilinear displacement on the pixel point in the second face image.

Figure 18:
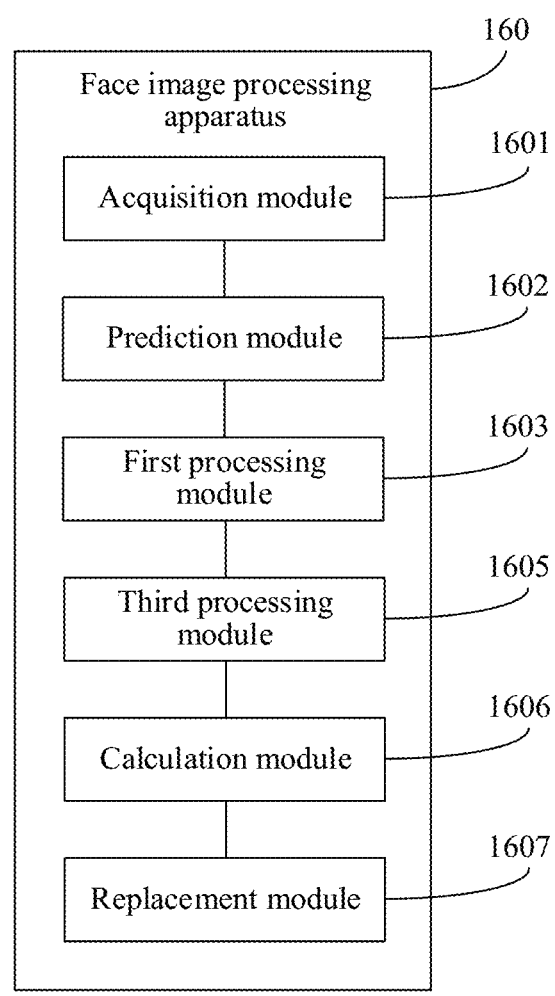
FIG. 18 is a schematic structural diagram of a face image processing apparatus provided according to an embodiment of this disclosure.

Alternatively, as shown in FIG. 18, the apparatus 160 further includes:

a third processing module 1605, configured to perform semantic image segmentation on the second face image to obtain a hair region in the second face image;

a calculation module 1606, configured to calculate a corresponding target color value of the pixel point in the hair region at the specified age in a mapping manner based on an original color value of a pixel point in the hair region; and a replacement module 1607, configured to replace the original color value of the pixel point in the hair region by the target color value.

Figure 19:
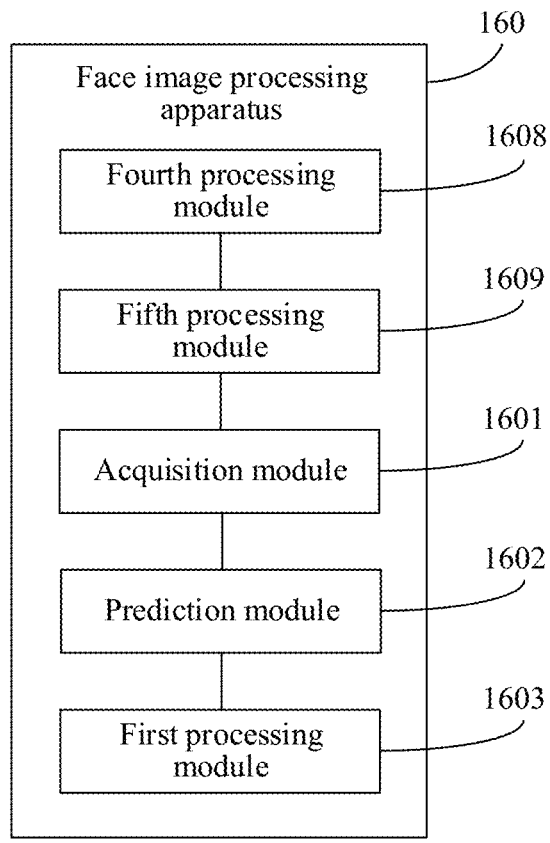
FIG. 19 is a schematic structural diagram of a face image processing apparatus provided according to an embodiment of this disclosure.

Alternatively, as shown in FIG. 19, the apparatus 160 further includes:

a fourth processing module 1608, configured to input the first face image into a face detection model, and output a face alignment point in the first face image; and a fifth processing module 1609, configured to perform image matting on the first face image according to the face alignment point and affine transformation to obtain an aligned first face image.

Figure 20:
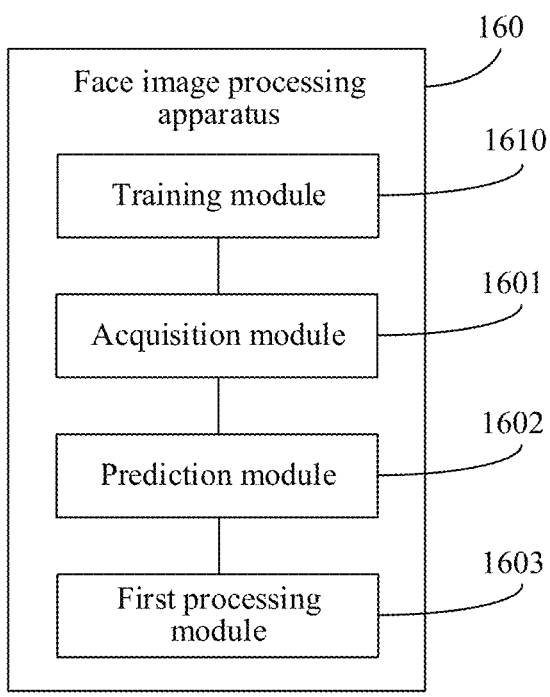
FIG. 20 is a schematic structural diagram of a face image processing apparatus provided according to an embodiment of this disclosure.

Alternatively, as shown in FIG. 20, the apparatus 160 further includes a training module 1610; the age change model is obtained by training by the training module 1610; the training module 1610 is configured to:

acquire a sample image set, the sample image set including a sample image and a sample age label of the sample image; determine a specified age, the specified age being a random age or the sample age label; invoke a generator in a generative adversarial network to predict, based on the specified age, the sample image to obtain a predicted face image; invoke a discriminator in the generative adversarial network to calculate an adversarial loss of the predicted face image, the adversarial loss being used for representing whether the predicted face image is a loss of a real face image; invoke the age prediction model to predict a predicted age of the predicted face image, and calculate an age loss between the predicted age and the specified age; train the generator based on the adversarial loss and the age loss; and determine the generator to be the age change model in a case that a training end condition is satisfied.

Alternatively, the training module 1610 is configured to: invoke the age prediction model to perform age prediction on the sample image to obtain the sample image and the sample age label; and determine the sample image and the sample age label of the sample image to be the sample image set.

Alternatively, the training module 1610 is configured to: input the sample image into a face detection model, and output a face alignment point in the sample image; and perform image matting on the sample image according to the face alignment point and affine transformation to obtain an aligned sample image.

Alternatively, the generator includes a conditional generative network layer and a texture synthesis network layer. the training module 1610 is configured to:

invoke the conditional generative network layer to predict, based on the specified age, the sample image, and output the texture difference map, the texture difference map being used for reflecting the texture difference between the face texture in the sample image and the face texture of the specified age; and invoke the texture synthesis network layer to superimpose the texture difference map with the sample image to obtain the predicted face image.

Alternatively, the conditional generative network layer is further used for outputting an attention map; and the attention map is used for reflecting a weight coefficient of the texture difference corresponding to a pixel point in the sample image. The training module 1610 is configured to:

invoke the texture synthesis network layer to superimpose, based on the attention map, the texture difference map with the sample image to obtain the predicted face image.

Alternatively, the generator further includes a shape change network layer. The training module 1610 is configured to:

invoke the shape change network layer to perform shape change processing on a face in the predicted face image.

Alternatively, the conditional generative network layer is further used for outputting a shape change information map; and the shape change information map is used for predicting a face shape change of the face in the sample image relative to the specified age. The training module 1610 is configured to:

invoke the shape change network layer to perform, based on the shape change information map, shape change processing on the face in the predicted face image.

Alternatively, the shape change information map includes displacement information corresponding to the pixel point in a first direction and a second direction, the first direction and the second direction being perpendicular to each other; The training module 1610 is configured to:

invoke the shape change network layer to perform, based on the displacement information in the first direction and the second direction, bilinear displacement on the pixel point in the predicted face image.

Figure 21:
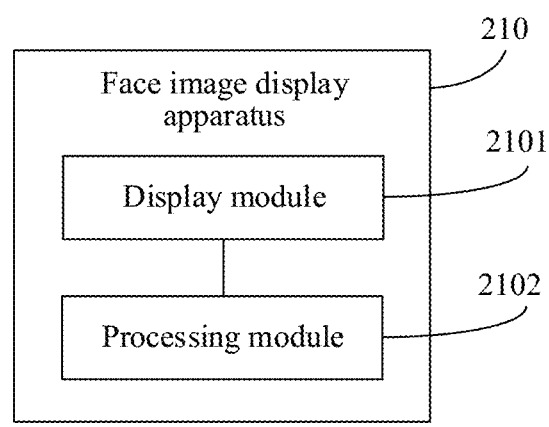
FIG. 21 is a schematic structural diagram of a face image display apparatus provided according to an embodiment of this disclosure.

FIG. 21 is a schematic structural diagram of a face image display apparatus provided according to an embodiment of this disclosure. The apparatus can be applied to a computer device or a client on the computer device. As shown in FIG. 21, the apparatus 210 includes:

a display module 2101, configured to display a first face image and an age change control, the age change control being a control used for inputting a specified age; and a processing module 2102, configured to process, in response to a trigger operation for the age change control, the first face image according to the specified age corresponding to the trigger operation to obtain a second face image, the second face image being a face image of a face in the first face image at the specified age. The processing module 2102 is configured to invoke, in response to a trigger operation for the age change control, an age change model to process the first face image according to the specified age corresponding to the trigger operation to obtain a second face image, the second face image being a face image of a face in the first face image at the specified age. The age change model is the age change model mentioned in the above-mentioned embodiments.

The display module 2101 is configured to display the second face image.

Alternatively, the display module 2101 is configured to display the second face image and the specified age.

Figure 22:
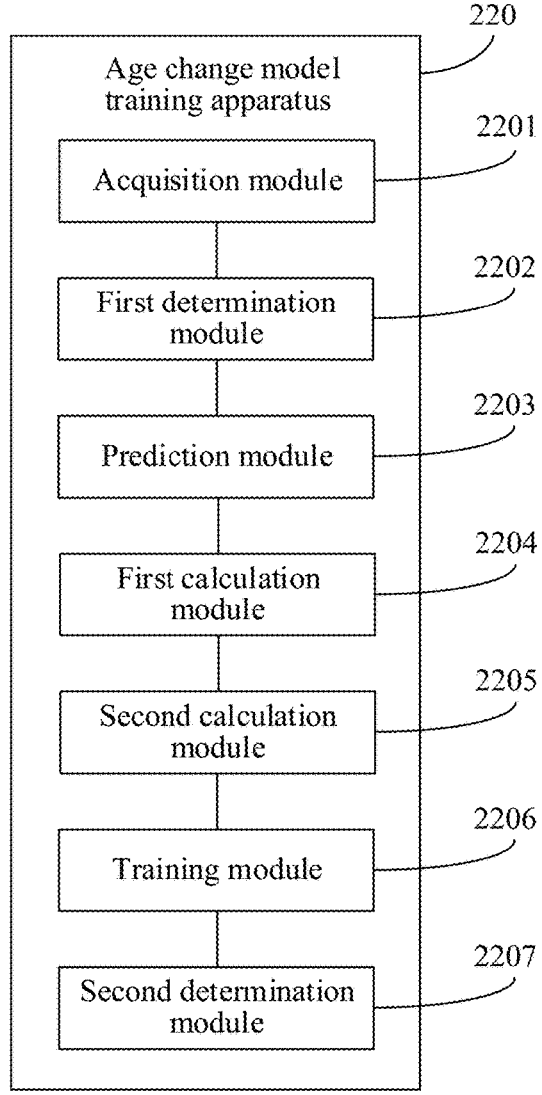
FIG. 22 is a schematic structural diagram of an age change model training apparatus provided according to an embodiment of this disclosure.

FIG. 22 is a schematic structural diagram of an age change model training apparatus provided according to an embodiment of this disclosure. The apparatus can be applied to a computer device or a client on the computer device. As shown in FIG. 22, the apparatus 220 includes:

an acquisition module 2201, configured to acquire a sample image set, the sample image set including a sample image and a sample age label of the sample image;

a first determination module 2202, configured to determine a specified age, the specified age being a random age or the sample age label;

a prediction module 2203, configured to invoke a generator in a generative adversarial network to predict, based on the specified age, the sample image to obtain a predicted face image;

a first calculation module 2204, configured to invoke a discriminator in the generative adversarial network to calculate an adversarial loss of the predicted face image, the adversarial loss being used for representing whether the predicted face image is a loss of a real face image;

a second calculation module 2205, configured to invoke an age prediction model to predict a predicted age of the predicted face image, and calculate an age loss between the predicted age and the specified age;

a training module 2206, configured to train the generator according to the adversarial loss and the age loss; and a second determination module 2207, configured to determine, in a case that a training end condition is satisfied, the generator to be an age change model.

Alternatively, the acquisition module 2201 is configured to:

invoke the age prediction model to perform age prediction on the sample image to obtain the sample image and the sample age label; and determine the sample image and the sample age label of the sample image to be the sample image set.

Figure 23:
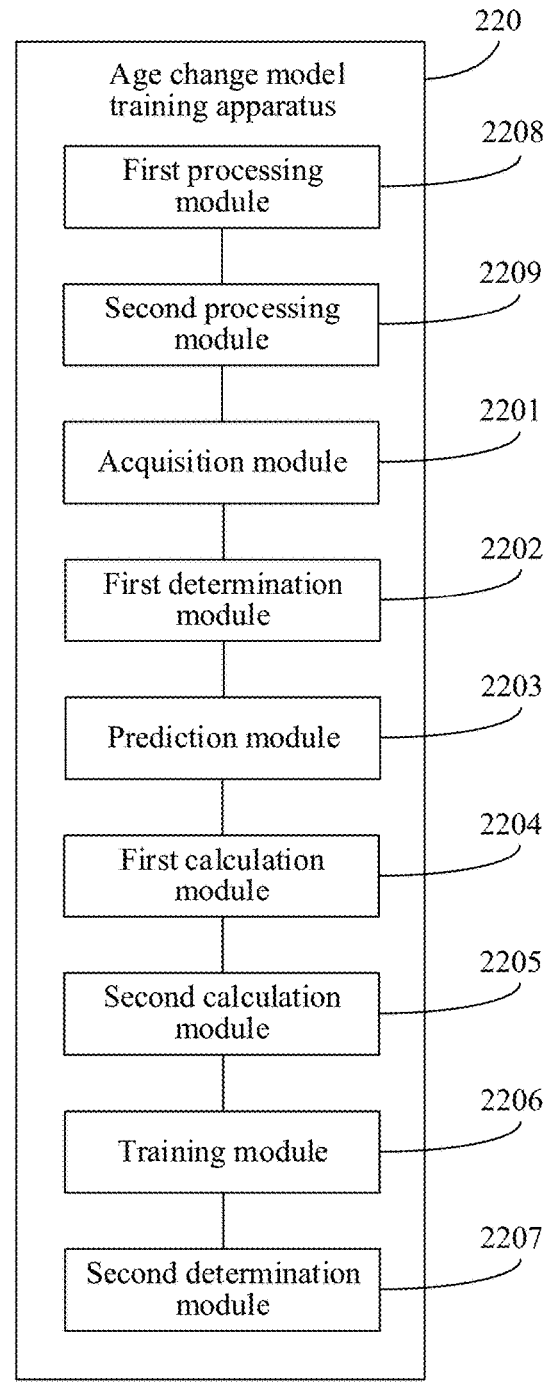
FIG. 23 is a schematic structural diagram of another age change model training apparatus provided according to an embodiment of this disclosure.

Alternatively, as shown in FIG. 23, the apparatus 220 further includes:

a first processing module 2208, configured to input the sample image into a face detection model, and output a face alignment point in the sample image; and a second processing module 2209, configured to perform image matting on the sample image according to the face alignment point and affine transformation to obtain an aligned sample image.

Alternatively, the generator includes a conditional generative network layer and a texture synthesis network layer. The prediction module 2203 is configured to:

invoke the conditional generative network layer to predict, based on the specified age, the sample image, and output the texture difference map, the texture difference map being used for reflecting the texture difference between the face texture in the sample image and the face texture of the specified age; and invoke the texture synthesis network layer to superimpose the texture difference map with the sample image to obtain the predicted face image.

Alternatively, the conditional generative network layer is further used for outputting an attention map; and the attention map is used for reflecting a weight coefficient of the texture difference corresponding to a pixel point in the sample image. The prediction module 2203 is configured to:

invoke the texture synthesis network layer to superimpose, based on the attention map, the texture difference map with the sample image to obtain the predicted face image.

Alternatively, the generator further includes a shape change network layer. The prediction module 2203 is configured to:

invoke the shape change network layer to perform shape change processing on a face in the predicted face image.

Alternatively, the conditional generative network layer is further used for outputting a shape change information map; and the shape change information map is used for predicting a face shape change of the face in the sample image relative to the specified age. The prediction module 2203 is configured to:

invoke the shape change network layer to perform, based on the shape change information map, shape change processing on the face in the predicted face image.

Alternatively, the shape change information map includes displacement information corresponding to the pixel point in a first direction and a second direction, the first direction and the second direction being perpendicular to each other; The prediction module 2203 is configured to:

invoke the shape change network layer to perform, based on the displacement information in the first direction and the second direction, bilinear displacement on the pixel point in the predicted face image.

The face image processing apparatus provided in the foregoing embodiments is illustrated with an example of division of the foregoing functional modules. In actual application, the foregoing functions may be assigned to and completed by different function modules as required. That is, an internal structure of the device may be divided into different function modules to complete all or some of the functions described above. In addition, the face image processing apparatus provided in the foregoing embodiment belongs to the same idea as the face image processing method. See the method embodiment for a specific implementation process thereof, and details are not described herein again.

Likewise, according to the face image displaying apparatus in the above embodiment, only division of the functional modules is illustrated. In actual application, the functions may be assigned to different functional modules for completion as required. In other words, an internal structure of the device is divided into different functional modules to complete all or a part of the functions described above. In addition, embodiments of the face image displaying apparatus and the face image displaying method provided in the foregoing embodiments belong to the same concept. For the specific implementation process, reference may be made to the method embodiments, and details are not described herein again.

Likewise, according to the age change model training apparatus in the above embodiment, only division of the functional modules is illustrated. In actual application, the functions may be assigned to different functional modules for completion as required. In other words, an internal structure of the device is divided into different functional modules to complete all or a part of the functions described above. In addition, the age change model training apparatus and age change model training method embodiments provided in the foregoing embodiments belong to one conception. For the specific implementation process, reference may be made to the method embodiments, and details are not described herein again.

An embodiment of this disclosure further provides a computer device, including a processor and a memory, the memory storing at least one instruction, at least one segment of program, a code set or an instruction set, the at least one instruction, the at least one segment of program, the code set or the instruction set being loaded and executed by the processor to implement the face image processing method, the face image displaying method, or the age change model training method provided in the foregoing method embodiments.

Figure 24:
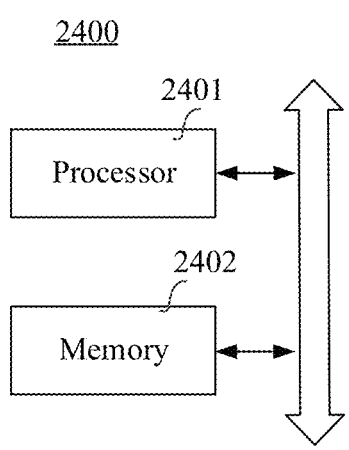
FIG. 24 is a schematic structural diagram of a terminal provided according to an embodiment of this disclosure.

Optionally, the computer device is a terminal. For example, FIG. 24 is a schematic structural diagram of a terminal according to an embodiment of this disclosure.

Generally, the terminal 2400 includes a processor 2401 and a memory 2402.

The processor 2401 may include one or more processing cores, for example, a 4-core processor or an 8-core processor. The processor 2401 may be implemented by using at least one hardware form of a digital signal processor (DSP), a field-programmable gate array (FPGA), and a programmable logic array (PLA). The processor 2401 may also include a main processor and a co-processor. The main processor is a processor for processing data in a wake-up state, also referred to as a central processing unit (CPU). The coprocessor is a low-power processor configured to process data in a standby state. In some embodiments, the processor 2401 may be integrated with a graphics processing unit (GPU) that is responsible for rendering and drawing content needing to be displayed by a display screen. In some embodiments, the processor 2401 may further include an artificial intelligence (AI) processor. The AI processor is configured to process computing operations related to machine learning.

The memory 2402 may include one or more non-transitory computer-readable storage media that may be non-transitory. The memory 2402 may further include a high-speed random access memory and a nonvolatile memory, for example, one or more disk storage devices or flash storage devices. In some embodiments, a non-transitory computer-readable storage medium in the memory 2402 is configured to store at least one instruction, the at least one instruction being configured to be executed by the processor 2401 to implement the method provided in the method embodiments of this disclosure.

An embodiment of this disclosure further provides a non-transitory computer-readable storage medium, the non-transitory computer-readable storage medium storing at least one piece of program code, the program code, when loaded and executed by a processor of a computer device, implementing the face image processing method, the face image displaying method, or the age change model training method according to the foregoing method embodiments.

This application further provides a computer program product or a computer program is provided, the computer program product or the computer program including computer instructions, the computer instructions being stored in a non-transitory computer-readable storage medium. A processor of the computer device reads the computer instructions from the computer-readable storage medium and executes the computer instructions to cause the computer device to implement the face image processing method, the face image displaying method, or the age change model training method according to the foregoing method embodiments.

What is claimed is:

1. A method for face image processing, comprising:
   acquiring a first face image of a person;
   invoking an age change model to predict a texture difference map of the first face image at a specified age, the texture difference map being used for reflecting a texture difference between a face texture in the first face image and a face texture of a second face image of the person at the specified age, and the texture difference comprising at least one of: a face skin feature difference; a hair color feature difference; or a beard feature difference; and
   performing image processing on the first face image based on the texture difference map to obtain the second face image.

2. The method according to claim 1, wherein:
   the age change model comprises a conditional generative network layer and a texture synthesis network layer;
   invoking the age change model to predict the texture difference map comprises:
      invoking the conditional generative network layer to perform prediction on the first face image according to the specified age, and outputting the texture difference map; and
   performing the image processing on the first face image based on the texture difference map to obtain the second face image comprises:
      invoking the texture synthesis network layer to superimpose the texture difference map with the first face image to obtain the second face image.

3. The method according to claim 2, wherein:
   the method further comprises:
      invoking the conditional generative network layer to output an attention map, the attention map being used for reflecting a weight coefficient of the texture difference corresponding to a pixel in the first face image; and
   invoking the texture synthesis network layer to superimpose the texture difference map with the first face image to obtain the second face image comprises:
      invoking the texture synthesis network layer to superimpose the texture difference map with the first face image based on the attention map, to obtain the second face image.

4. The method according to claim 2, wherein the age change model further comprises a shape change network layer; and the method further comprises:
   invoking the shape change network layer to perform shape change processing on a face in the second face image.

5. The method according to claim 4, wherein:
   the method further comprises:
   invoking the conditional generative network layer to output a shape change information map, the shape change information map being used for predicting a face shape change of the face in the first face image relative to the specified age; and
   invoking the shape change network layer to perform the shape change processing on the face in the second face image comprises:
      invoking the shape change network layer to perform the shape change processing on the face in the second face image, based on the shape change information map.

6. The method according to claim 5, wherein:
   the shape change information map comprises displacement information for a pixel in the second face image in a first direction and a second direction, the first direction and the second direction being perpendicular to each other; and
   invoking the shape change network layer to perform the shape change processing on the face in the second face image comprises:
      invoking the shape change network layer to perform, based on the displacement information in the first direction and the second direction, bilinear displacement on the pixel in the second face image.

7. The method according to claim 1, further comprising:
   performing semantic image segmentation on the second face image to obtain a hair region in the second face image;
   calculating, in a mapping manner, a target color value of a pixel in the hair region at the specified age, based on an original color value of the pixel in the hair region; and
   replacing the original color value of the pixel in the hair region with the target color value.

8. A method for training an age change model, comprising:
   acquiring a sample image set, the sample image set comprising a sample image and a sample age label corresponding to the sample image;
   determining a specified age, the specified age being a random age or an age indicated by the sample age label corresponding to the sample image;
   invoking a conditional generative network layer of a generator in a generative adversarial network to perform prediction on the sample image according to the specified age, and output a texture difference map, the texture difference map being used for reflecting a face texture difference of a face in the sample image relative to the face at the specified age, and the texture difference comprising at least one of: a face skin feature difference; a hair color feature difference; or a beard feature difference;
   invoking a texture synthesis network layer of the generator to superimpose the texture difference map with the sample image to obtain a predicted face image;
   invoking a discriminator in the generative adversarial network to calculate an adversarial loss of the predicted face image, the adversarial loss being used for representing whether the predicted face image is a loss of a real face image;
invoking an age prediction model to predict a predicted age of the predicted face image, and calculating an age loss between the predicted age and the specified age;
training the generator according to the adversarial loss and the age loss; and
determining the generator to be the age change model in response to a training end condition being satisfied.

9. The method according to claim 8, wherein acquiring the sample image set comprises:
invoking the age prediction model to perform age prediction on the sample image to obtain the sample age label corresponding to the sample image; and
determining the sample image and the sample age label corresponding to the sample image to be the sample image set.

10. The method according to claim 9, further comprising:
inputting the sample image into a face detection model, and outputting a face alignment point in the sample image; and
performing image matting on the sample image using an affine transformation according to the face alignment point to obtain an aligned sample image.

11. The method according to claim 8, wherein:
the method further comprises:
invoking the conditional generative network layer to output an attention map, the attention map being used for reflecting a weight coefficient of the texture difference corresponding to a pixel in the sample image; and
invoking the texture synthesis network layer to superimpose the texture difference map with the sample image to obtain the predicted face image comprises:
invoking the texture synthesis network layer to superimpose the texture difference map with the sample image based on the attention map, to obtain the predicted face image.

12. The method according to claim 8, wherein:
the generator further comprises a shape change network layer; and
the method further comprises invoking the shape change network layer to perform shape change processing on a face in the predicted face image.

13. A device for face image processing, the device comprising a memory for storing computer instructions and a processor in communication with the memory, wherein, when the processor executes the computer instructions, the processor is configured to cause the device to:
acquire a first face image of a person;
invoke an age change model to predict a texture difference map of the first face image at a specified age, the texture difference map being used for reflecting a texture difference between a face texture in the first face image and a face texture of a second face image of the person at the specified age, and the texture difference comprising at least one of: a face skin feature difference; a hair color feature difference; or a beard feature difference; and
perform image processing on the first face image based on the texture difference map to obtain the second face image.

14. The device according to claim 13, wherein:
the age change model comprises a conditional generative network layer and a texture synthesis network layer;

when the processor is configured to cause the device to invoke the age change model to predict the texture difference map, the processor is configured to cause the device to:
invoke the conditional generative network layer to perform prediction on the first face image according to the specified age, and outputting the texture difference map; and
when the processor is configured to cause the device to perform the image processing on the first face image based on the texture difference map to obtain the second face image, the processor is configured to cause the device to:
invoke the texture synthesis network layer to superimpose the texture difference map with the first face image to obtain the second face image.

15. The device according to claim 14, wherein:
when the processor executes the computer instructions, the processor is configured to further cause the device to:
invoke the conditional generative network layer to output an attention map, the attention map being used for reflecting a weight coefficient of the texture difference corresponding to a pixel in the first face image; and
when the processor is configured to cause the device to invoke the texture synthesis network layer to superimpose the texture difference map with the first face image to obtain the second face image, the processor is configured to cause the device to:
invoke the texture synthesis network layer to superimpose the texture difference map with the first face image based on the attention map, to obtain the second face image.

16. The device according to claim 14, wherein the age change model further comprises a shape change network layer; wherein, when the processor executes the computer instructions, the processor is configured to further cause the device to:
invoke the shape change network layer to perform shape change processing on a face in the second face image.

17. The device according to claim 16, wherein:
when the processor executes the computer instructions, the processor is configured to further cause the device to:
invoke the conditional generative network layer to output a shape change information map, the shape change information map being used for predicting a face shape change of the face in the first face image relative to the specified age; and
when the processor is configured to cause the device to invoke the shape change network layer to perform the shape change processing on the face in the second face image, the processor is configured to cause the device to:
invoke the shape change network layer to perform the shape change processing on the face in the second face image, based on the shape change information map.

18. The device according to claim 17, wherein:
the shape change information map comprises displacement information for a pixel in the second face image in a first direction and a second direction, the first direction and the second direction being perpendicular to each other; and
when the processor is configured to cause the device to invoke the shape change network layer to perform the shape change processing on the face in the second face image, the processor is configured to cause the device to:
invoke the shape change network layer to perform, based on the displacement information in the first direction and the second direction, bilinear displacement on the pixel in the second face image.

19. The device according to claim 13, wherein, when the processor executes the computer instructions, the processor is configured to further cause the device to:
perform semantic image segmentation on the second face image to obtain a hair region in the second face image;
calculate, in a mapping manner, a target color value of a pixel in the hair region at the specified age, based on an original color value of the pixel in the hair region; and
replace the original color value of the pixel in the hair region with the target color value.

* * * * *